United States Patent [19]

Takahashi et al.

[11] Patent Number: 6,006,319
[45] Date of Patent: *Dec. 21, 1999

[54] COPROCESSOR SYSTEM FOR ACCESSING SHARED MEMORY DURING UNUSED PORTION OF MAIN PROCESSOR'S INSTRUCTION CYCLE WHERE MAIN PROCESSOR NEVER WAITS WHEN ACCESSING SHARED MEMORY

[75] Inventors: Toyofumi Takahashi; Toshio Tanaka; Hideaki Terakawa, all of Hyogo, Japan

[73] Assignees: Creative Design Inc., Hyogo; Nintendo Co., Ltd., Kyoto-fu, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/605,041

[22] PCT Filed: Jul. 4, 1995

[86] PCT No.: PCT/JP95/01332

§ 371 Date: Mar. 20, 1996

§ 102(e) Date: Mar. 20, 1996

[87] PCT Pub. No.: WO96/01451

PCT Pub. Date: Jan. 18, 1996

[30] Foreign Application Priority Data

Jul. 4, 1994 [JP] Japan .................................. 6-152508

[51] Int. Cl.[6] .................................................. G06F 15/00
[52] U.S. Cl. .............................. 712/34; 345/503; 463/45
[58] Field of Search ................................ 395/501, 502, 395/503, 504, 505, 512, 200.38, 800.34, 553, 559, 555; 463/31, 33, 43, 44, 45; 345/501–505, 512; 709/208, 400; 712/34; 713/500, 600

[56] References Cited

U.S. PATENT DOCUMENTS

| | | | |
|---|---|---|---|
| 4,089,524 | 5/1978 | Hauck ........................................ | 463/31 |
| 4,777,621 | 10/1988 | Miner et al. ............................. | 345/526 |
| 5,103,499 | 4/1992 | Miner et al. ............................. | 345/503 |
| 5,283,902 | 2/1994 | Dorn ....................................... | 395/301 |
| 5,357,604 | 10/1994 | San et al. . | |
| 5,388,841 | 2/1995 | San et al. . | |
| 5,395,112 | 3/1995 | Darling ................................... | 463/44 |
| 5,471,607 | 11/1995 | Garde ...................................... | 395/559 |
| 5,551,045 | 8/1996 | Kawamoto et al. .................... | 395/652 |
| 5,594,473 | 1/1997 | Miner et al. ............................. | 345/199 |
| 5,599,232 | 2/1997 | Darling ................................... | 463/44 |
| 5,680,534 | 10/1997 | Yamato et al. ......................... | 395/173 |
| 5,685,005 | 11/1997 | Garde et al. ........................... | 395/800 |
| 5,691,493 | 11/1997 | Usami et al. ........................... | 84/602 |
| 5,787,488 | 7/1998 | Garde ...................................... | 711/169 |
| 5,802,376 | 9/1998 | DeRoo et al. .......................... | 710/200 |
| 5,850,230 | 12/1998 | San et al. ................................ | 345/501 |

OTHER PUBLICATIONS

Synchronized Dual 8051 Shared RAM System, IBM Technical Disclosure Bulletin, vol. 30, No. 5, Oct. 1987, pp. 163–72.

Bradly K. Fawcett, The Z8000 Microprocessor: A Design Handbook, Prentice–Hall, 1982, Ch. 6, Jul. 1983.

*Primary Examiner*—Zarni Maung
*Assistant Examiner*—Andrew Caldwell
*Attorney, Agent, or Firm*—Nixon & Vanderhye P.C.

[57] ABSTRACT

A coprocessor system is disclosed in which a CPU in a game machine body and a CPU in a game cartridge are formed by CPU cores having the same architecture and memory mapping functions. The cycle time of a second CPU, for example the CPU in the game cartridge, is shorter than the cycle time of the first CPU, for example the CPU in the game machine body. The first CPU accesses memory during a first time period that is longer than the program memory access time but shorter than the first CPU cycle time. The second CPU accesses the program memory during a second time period, which is the time difference between the end of the first time period and the end of the first CPU's cycle time. The second CPU may also access the program memory during the first time period if no first CPU memory access is pending. Since the first CPU's memory access during the first time period has priority over the second CPU's, the first CPU never waits to access shared memory.

12 Claims, 29 Drawing Sheets

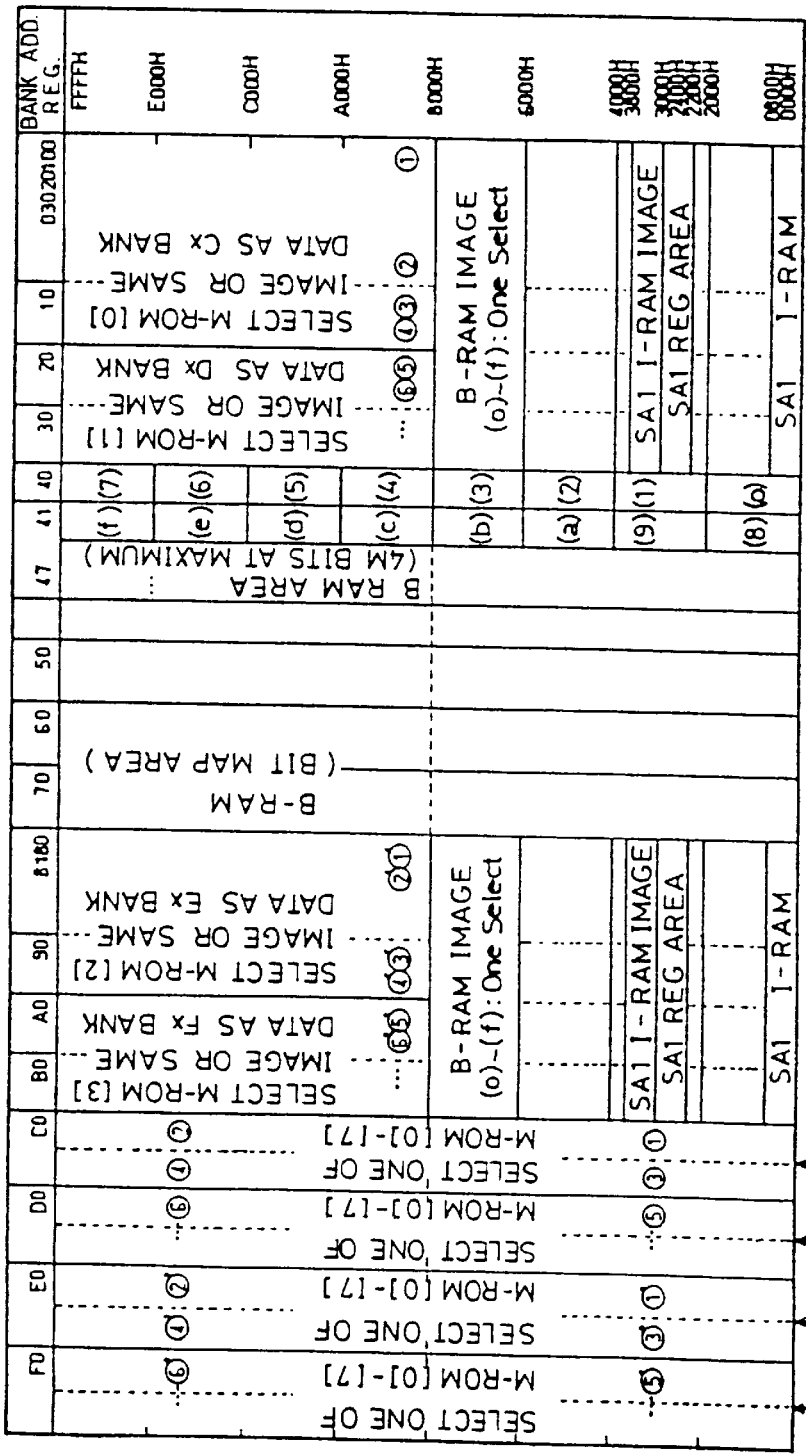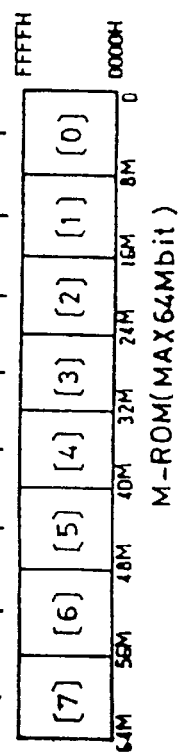
FIG.5

F I G. 9
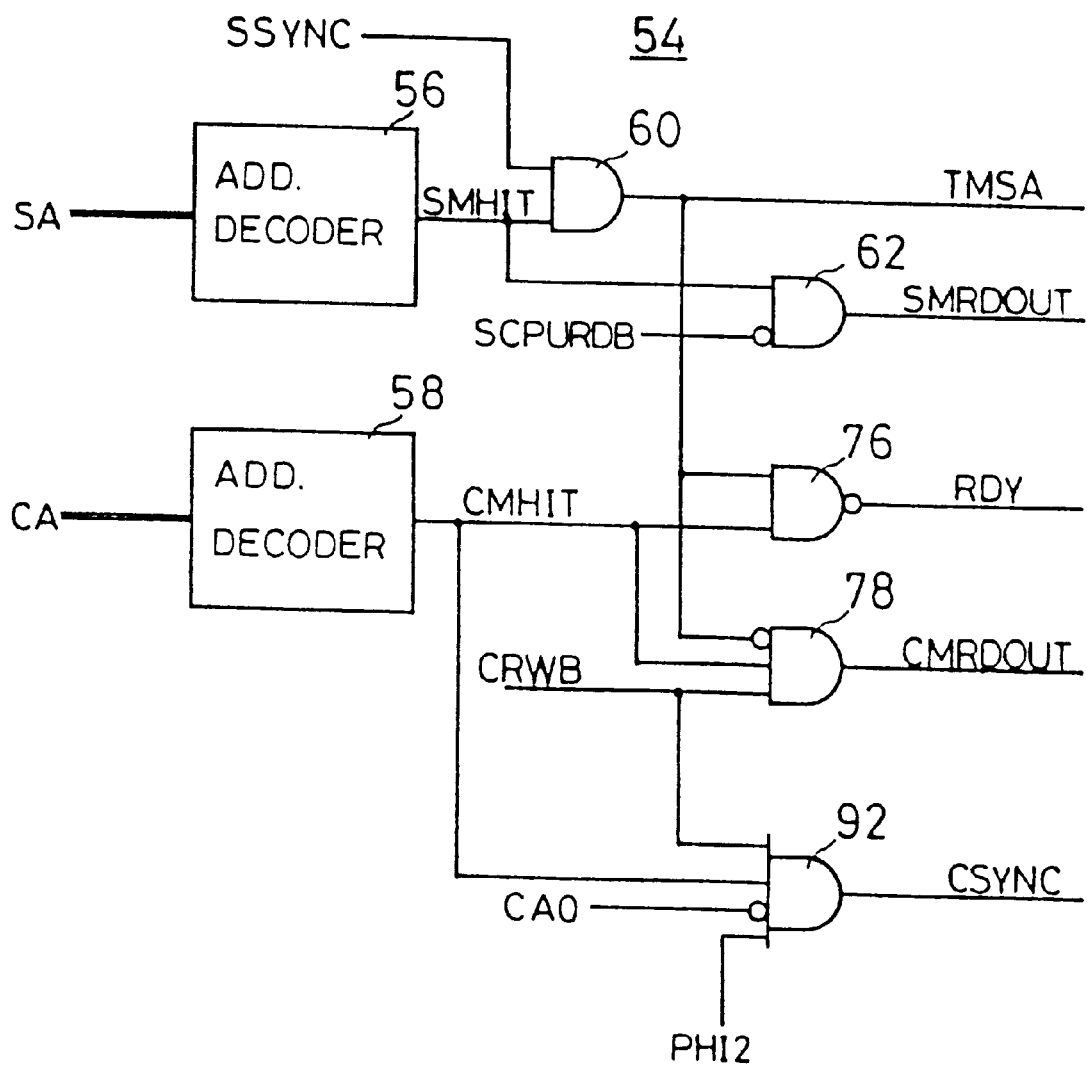

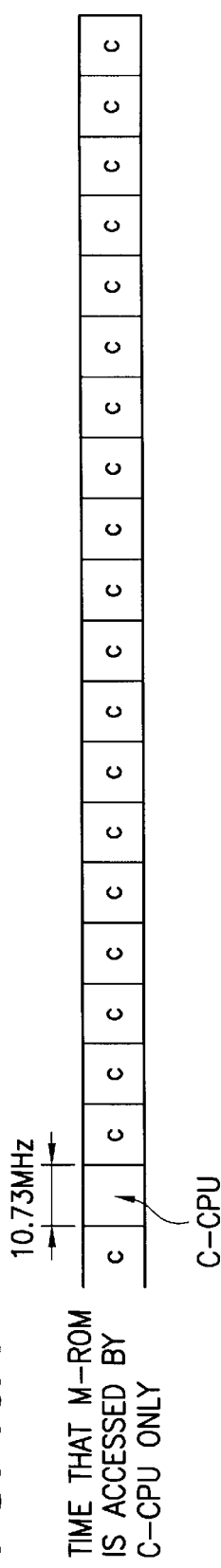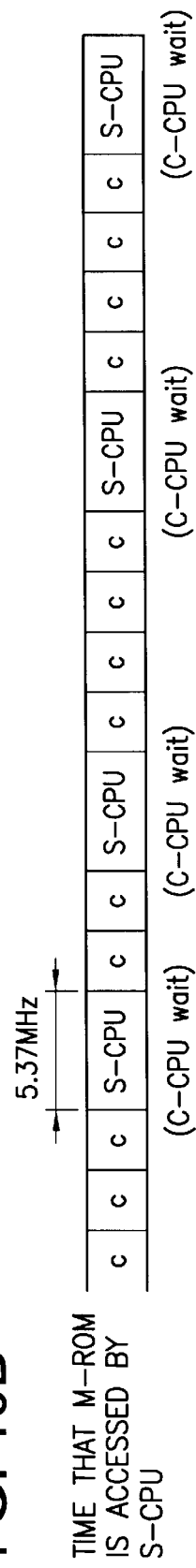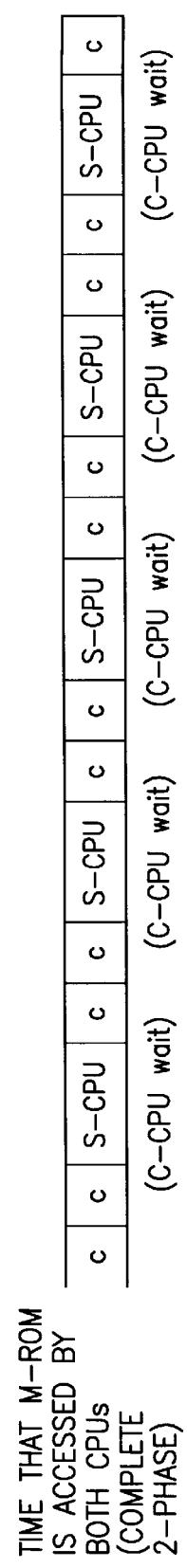
FIG. 10A TIME THAT M-ROM IS ACCESSED BY C-CPU ONLY
FIG. 10B TIME THAT M-ROM IS ACCESSED BY S-CPU
FIG. 10C TIME THAT M-ROM IS ACCESSED BY BOTH CPUs (COMPLETE 2-PHASE)

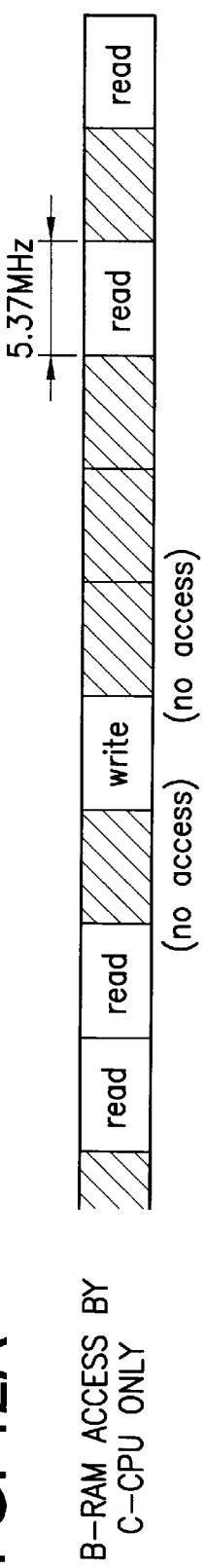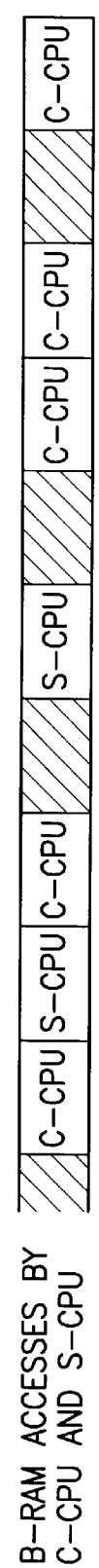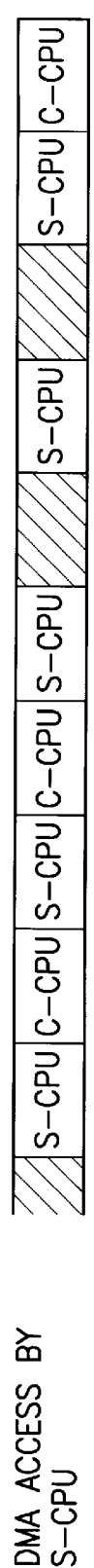
FIG. 12A  B-RAM ACCESS BY C-CPU ONLY
FIG. 12B  B-RAM ACCESSES BY C-CPU AND S-CPU
FIG. 12C  DMA ACCESS BY S-CPU

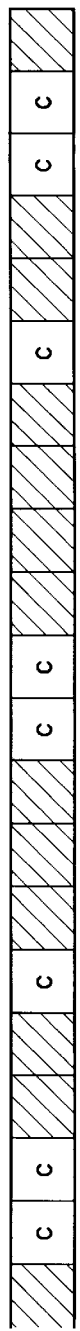
F I G. 13A  I-RAM ACCESS BY C-CPU ONLY
F I G. 13B  I-RAM ACCESSES BY BOTH CPUs F I G. 16
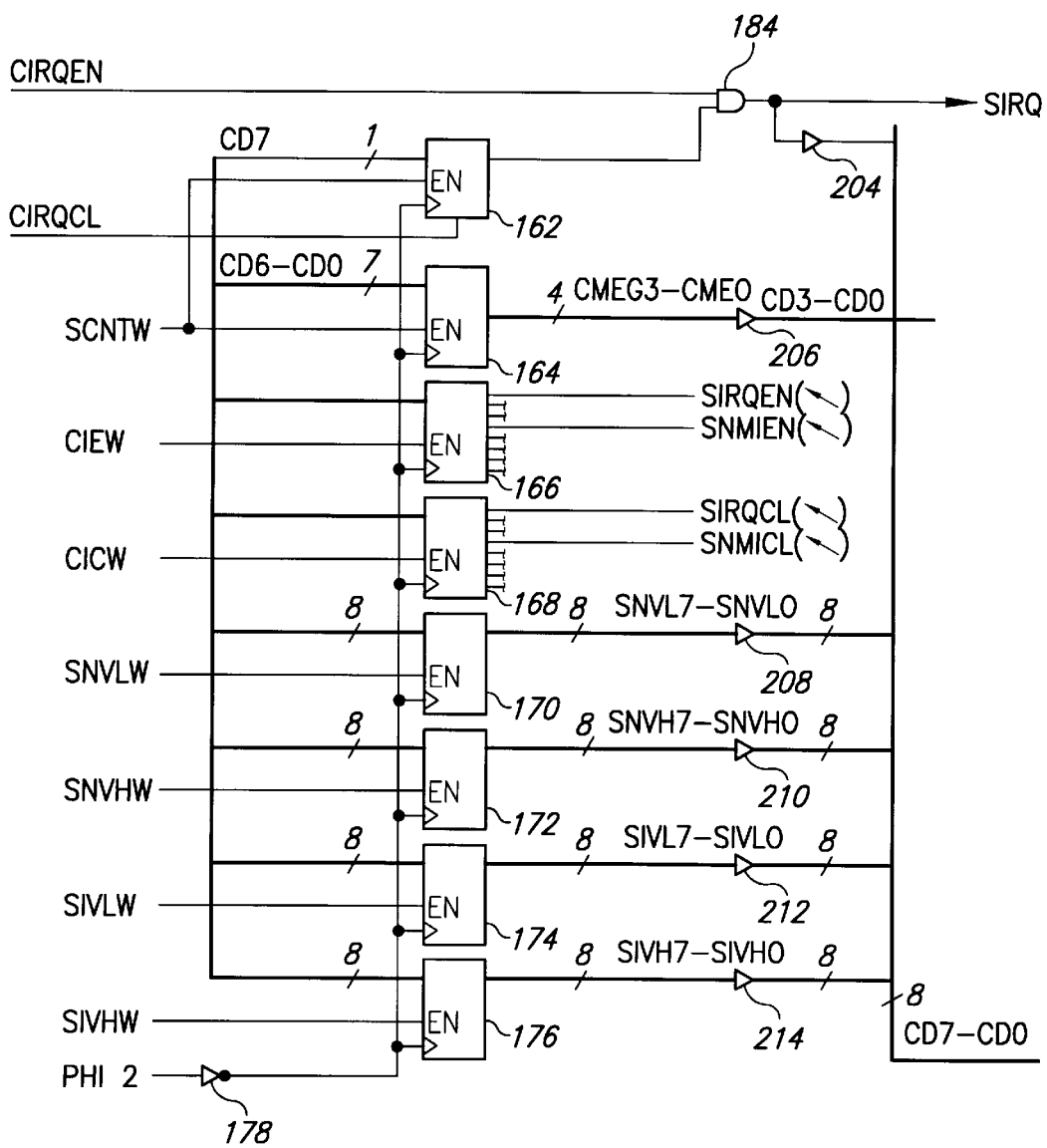

COPROCESSOR SYSTEM FOR ACCESSING SHARED MEMORY DURING UNUSED PORTION OF MAIN PROCESSOR'S INSTRUCTION CYCLE WHERE MAIN PROCESSOR NEVER WAITS WHEN ACCESSING SHARED MEMORY

BACKGROUND OF THE INVENTION

1. Field of the Invention

The present invention relates to a co-processor system and an external memory unit with an auxiliary processing function. More specifically, the present invention relates to a co-processor system and an external memory unit with an auxiliary processing function, in which a program is stored in a memory of the external memory unit which is detachably attached to an information processing apparatus such as a gaming machine and an image processing apparatus, and a processor provided in the external memory unit cooperates with a processor provided in the information processing apparatus.

2. Related Art

One example of such a kind of co-processor system is disclosed in, for example, Japanese Patent Application Laying-open No. 6-790093 laid-open on Mar. 22, 1994. In brief, this prior art is a system in which a CPU 1 within a main unit of an information processing apparatus and a further CPU 2 called a "Mario chip" access a program in a ROM 3 as shown in FIG. 1, and the CPU 1 executes information processings according to the program. In the prior art, the program for operating the CPU 1 is transferred from the ROM 3 to a RAM 4 and stored therein (down-loaded). Thereafter, the CPU 1 indirectly executes the program of the ROM 3 by directly accessing the program being transferred into the RAM 4. On the other hand, the Mario chip 2 directly accesses the ROM 3 to execute the program in a period that no data is transferred to the RAM 4, i.e., a period that the ROM 3 is not accessed by the CPU 1.

Furthermore, a parallel processing apparatus shown in FIG. 2 can be regarded as a kind of co-processsor system; however, in a case of FIG. 2 system, a first CPU 6a and a second CPU 6b are switched by a bus controller 5 to be connected to a ROM 7 in a time-sharing manner, whereby a necessary program is down-loaded from the ROM 7 to a first RAM 8a or a second RAM 8b. A common clock from a clock generator 9 is applied to the CPU 6a and the CPU 6b. Then, the CPU 6a or the CPU 6b individually and simultaneously or synchronously executes the program stored in the RAM 8a or the RAM 8b on the basis of the same clock. That is, in FIG. 2 system, the both CPUs 6a and 6b do not execute the program of the ROM 7 by directly accessing the ROM 7 in the same machine cycle period, and the program is transferred to the RAMs 8a and 8b corresponding to the CPUs 6a and 6b, and then, the CPUs 6a and 6b directly access the RAMs 8a and 8b, and therefore, the both CPUs 6a and 6b do not directly access the ROM 7 in the same operation cycle period.

In FIG. 1 prior art, the ROM 3 is occupied by the Mario chip 2 when the Mario chip 2 is to be operated. Thus, if it is required that the CPU 1 and the Mario chip 2 are to be simultaneously operated, it becomes necessary to provide a further memory such as the RAM 4. Therefore, in preparing a program, there are many operational limitations or restrictions. For example, (1) it is necessary to prepare programs individually for the CPU 1 and the Mario chip 2 on the basis of architectures suitable for the CPU 1 and the Mario chip 2. (2) If the program for the CPU 1 is to be incorporated within the ROM 3, as described above, the program must be down-loaded, and therefore, it is necessary to write the program in a series of ROM addresses. (3) If a capacity of the RAM 4 is low, the program necessary for the CPU 1 can not be loaded in whole, and therefore, it becomes necessary to divide the program into divided program blocks and to down-load respective divided program blocks. In case (3), it is necessary to write jump programs or sub-routine programs for each of the respective divided program blocks, and even if the same sub-routine program is to be used for the respective divided program block, the same sub-routine program must be prepared for each of the respective divided program blocks, and accordingly, much of the capacity of the ROM is wasted.

In FIG. 2 prior art, there is also the problem (3) of the above described FIG. 1 prior art, and in addition thereto, the RAM 8a and the RAM 8b are required, and therefore, the number of the components becomes large and the system becomes more expensive. If RAMs having small capacity are utilized to make the RAMs 8a and 8b inexpensive, the program data of the ROM 7 must be divided into program blocks each of which is equal to a maximum storage capacity of the RAM, causing the transfer of program data to the RAM frequently, and accordingly, execution of the program by the CPUs 6a and 6b are frequently stopped, and a waiting time for data transfer is increased, and a user must wait during the waiting time, and resultingly, rapid execution of the program is hindered.

SUMMARY OF THE INVENTION

Therefore, a principal object of the present invention is to provide a co-processor system capable of making an operation of the system rapid with no limitation or restriction to program.

Another object of the present invention is to provide an external memory unit with an auxiliary processing function capable of making an operation of an information processing apparatus rapid with no limitation or restriction to a program.

A further object of the present invention is to provide a co-processor system and an external memory unit with an auxiliary processing function, in which two processors having a common architecture can commonly use a program memory, and two processors can directly execute a program stored in the program memory non-synchronously, and accordingly, the program can be rapidly processed without use of RAMs for downloading programs and with an inexpensive structure.

A co-processor system according to the present invention comprises: a first processor (18) which performs operations on the basis of a program with a first cycle time; a second processor (34) which has an architecture which is the same as an architecture of the first processor and performs operations on the basis of the program with a second cycle time shorter than the first cycle time; a first clock supply means (23, 25) which supplies a first clock signal functioning as a reference of the first cycle time to the first processor; a second clock supply means (23, 216) which supplies a second clock signal functioning as a reference of the second cycle time to the second processor; a program memory (22) which can be accessed by the second processor to be rapidly read and which stores the program directly accessed by the first processor and the second processor; and an access control means (35, 54, 60, 52) which allows the first processor to directly access the program memory in a first time period longer than an access time of the program memory and shorter than the first cycle time and allows the second processor to directly access the program memory during a second time period that is between the first cycle time and the first time period.

An external memory unit with an auxiliary processing function which is detachably attached to an information processing apparatus including a first processor (18) which performs operations on the basis of a program with a first cycle time and a first clock supply means (23, 25) which supplies a first clock signal functioning as a reference for the first cycle time to the first processor, comprising a second processor (34) which has an architecture which is the same as an architecture of the first processor and performs operations on the basis of the program with a second cycle time shorter than the first cycle time; a second clock supply means (23, 216) which supplies a second clock signal functioning as a reference of the second cycle time to the second processor; a program memory (22) which can be accessed by the second processor to be rapidly read and which stores the program directly accessed by the first processor and the second processor; and an access control means (35, 54, 60, 52) which allows the first processor to directly access the program memory in a first time period longer than an access time of the program memory and shorter than the first cycle time and allows the second processor to directly access the program memory during a second time period that is between the first cycle time and the first time period.

A signal SSYNC, for example, defines the first time period and the second time period. That is, a time that the signal SSYNC is at a high level is the first time period, and a time that the signal SSYNC is at a low level is the second time period. In the first time period, the first processor directly accesses the program memory so as to execute operations according to the program data. In the second time period, the second processor directly accesses the program memory so as to execute operations according to the program data. Since the first processor and the second processor have the same architecture, there is program-compatibility, and accordingly, both processors can directly access the program memory and execute the operations.

In accordance wit the present invention, a program which is prepared in a manner that one CPU (processor) can execute the program in series can be changed to a program by which two CPUs (processors) operate in parallel with few changes. Furthermore, the program is not to be downloaded, and therefore, it is unnecessary to write the program in a series of ROM addresses. In addition, since it is unnecessary to store the same sub-routine for each of respective divided program block, unnecessary waste of ROM capacity does not occur. Accordingly, there is no limitation or restriction in preparing the program.

In accordance with the present invention, since RAMs to which the program is down-loaded are not required, cost of the system is reduced as a whole. Furthermore, in the case where an information processing apparatus having no RAMs to which the program is down-loaded has been put into market in advance, it was impossible to increase a processing ability with utilizing the prior art; however, if the external memory unit with auxiliary processing function according to the invention is utilized, it is possible to increase an information processing ability of the system as a whole with low cost.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustrative view showing a memory map for a C-CPU of FIG. 3 embodiment;

FIG. 9 is a block diagram showing in detail an M-ROM sequencer in FIG. 7 embodiment;

FIGS. 10A–C is an illustrative view showing a state where the M-ROM is accessed in FIG. 9 embodiment;

FIGS. 12A–C is an illustrative view showing a state where the B-RAM is accessed in FIG. 11 embodiment;

FIGS. 13A–C is an illustrative view showing a state where the I-RAM is accessed in FIG. 11 embodiment;

FIG. 16 is a block diagram showing in detail other portions of the SCPUIF in FIG. 7 embodiment;

DETAILED DESCRIPTION OF EXEMPLARY EMBODIMENTS

In the embodiment described in the following, the present invention is applied to a game system; however, it is noted that the present invention can be applied to an image processing system and other similar information systems as well as the game system.

Figure 1:
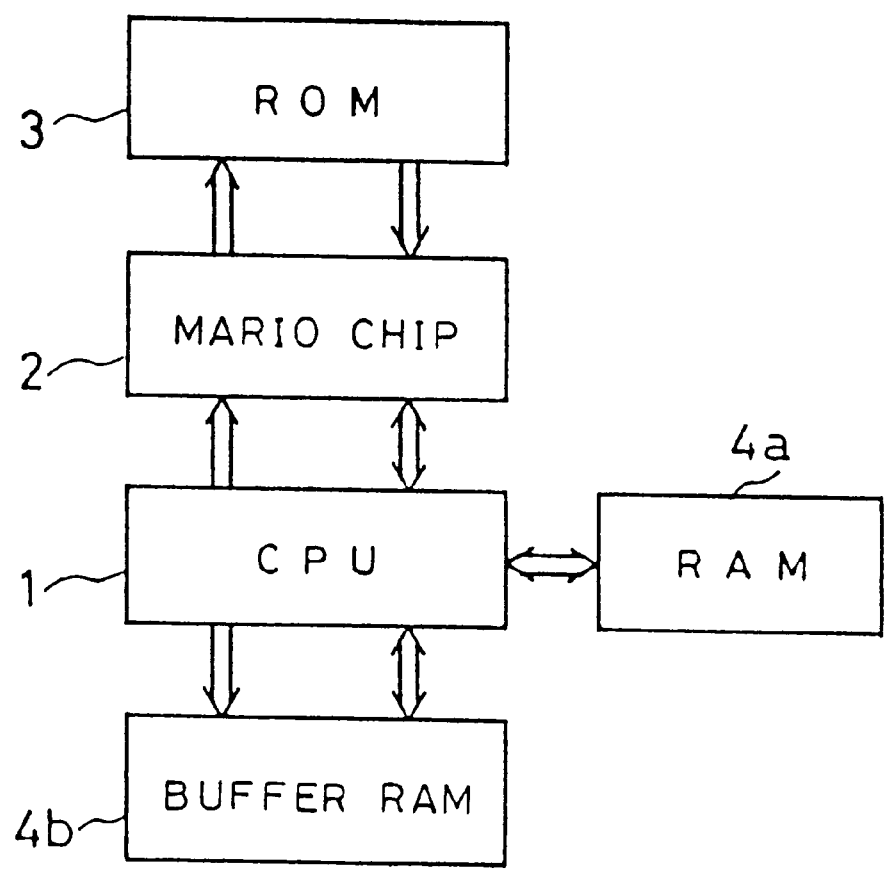
FIG. 1 is a block diagram showing in brief one example of a prior art.
Figure 2:
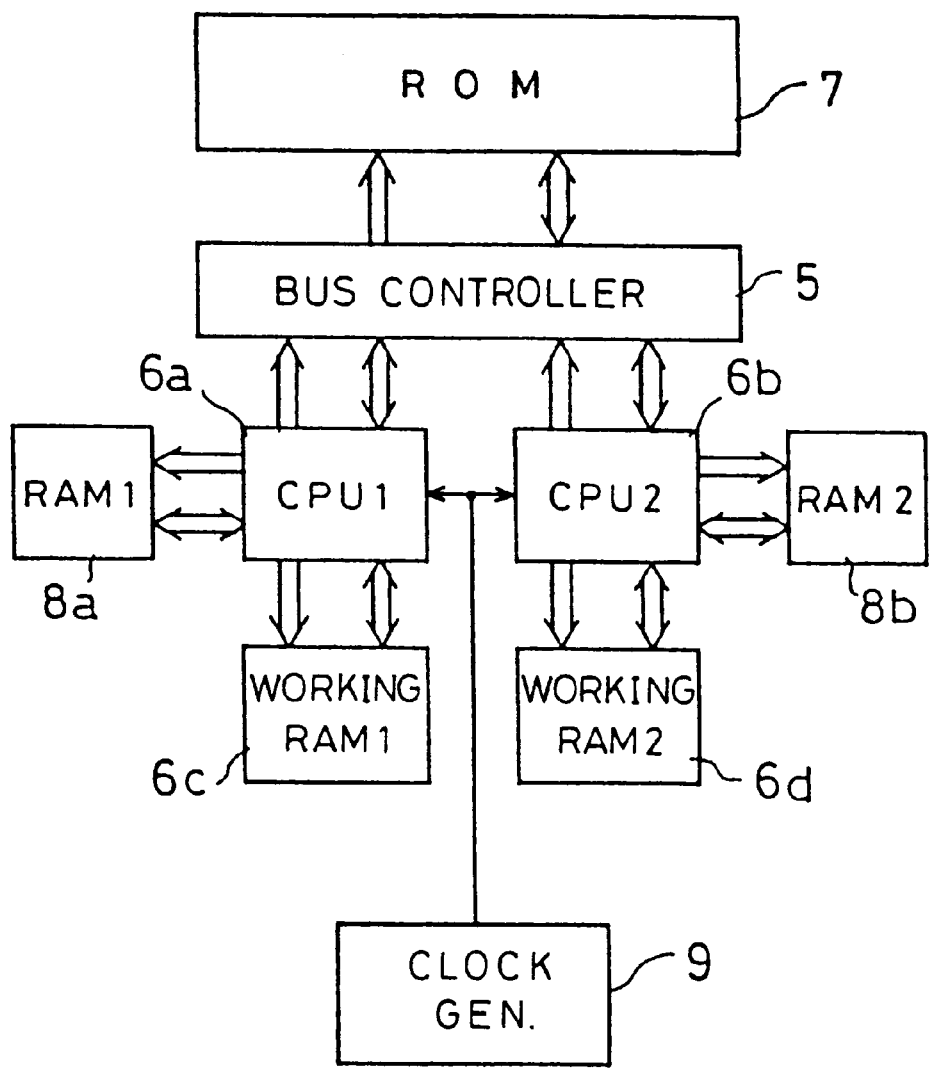
FIG. 2 is a block diagram showing in brief another example of a prior art.
Figure 3:
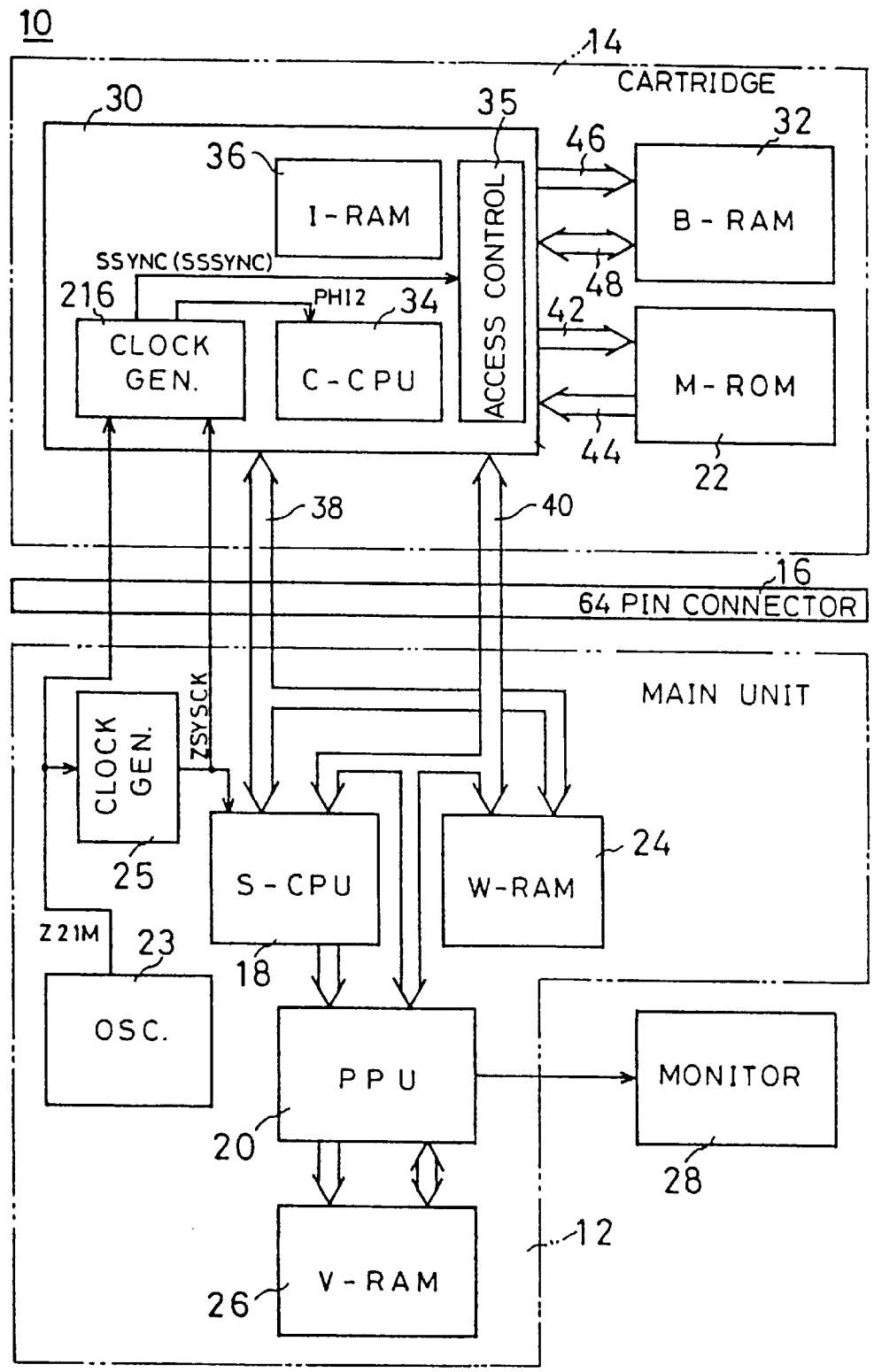
FIG. 3 is a block diagram showing one embodiment according to the present invention.

FIG. 3 is a block diagram of a co-processor system of one embodiment according to the present invention. A game system 10 which is one example of the co-processor system and shown in FIG. 3 includes a main unit 12, and a cartridge 14 which is one example of an external memory unit with an auxiliary processing function and detachably attached to the main unit 12 by a connector 16 having 64 pins, for example. The main unit 12 includes an S-CPU 18 as a main unit processor, and a PPU (Picture Processing Unit) 20. The S-CPU 18 is operated according to a program stored in advance in an M-ROM 22 included in the cartridge 14. The S-CPU 18 is connected with a working RAM of W-RAM 24. The main unit 12 further includes an oscillator 23, and an original clock signal Z21M having a frequency of approximately 21 MHz from the oscillator 23 which is applied to a clock generator 25. The clock generator 25 includes a frequency-divider by which the original clock signal Z21M is frequency-divided by, for example, ⅛ to generate a system clock, and the system clock signal ZSYSCK having a frequency of approximately 2.68 MHz is applied to the S-CPU 18. In addition, the original clock signal Z21M is also applied to a clock generator 216 (described later) of the cartridge 14 together with the system clock signal ZSYSCK. The PPU 20 executes image processings in cooperation with V-RAM 26 under control of the S-CPU 18 and applies a video signal to a monitor 28. Therefore, game images are displayed on a screen of the monitor 28. In addition, since general operations of the S-CPU 18 and the PPU 20 in the main unit 12 are well-known and having nothing to do with the present invention directly, detailed descriptions of the operations will be omitted here.

The cartridge 14 includes a co-processor 30 and a B-RAM 32 other than the above described M-ROM 22, the co-processor 30 also includes a C-CPU 34 as a CPU core for performing an auxiliary processing function, and an access control circuit 35, and I-RAM 36, and clock generator 216. The B-RAM 32 is a RAM being backed-up by a lithium battery, for example, and has a storage capacity of 4M bits, for example. The I-RAM 36 is constructed by an SRAM of 16K bits, for example. The B-RAM 32 and the I-RAM 36 function as external RAMs for the S-CPU 18 and the C-CPU, respectively. In addition, the M-ROM 22 is constructed as a masked ROM of 64M bits at maximum, for example, and in the M-ROM 22, a game program is stored. An access time of the M-ROM 22 is approximately 120 nsec. at 16-bit width (approximately 60 nsec. at 8-bit width), for example.

For each of the S-CPU 18 and the C-CPU 34, the same CPU core such as "65C816" manufactured by Western Design Corporation can be utilized. In addition, in this embodiment shown, an operation frequency of the C-CPU 34 is 10.73 MHz, and an operation frequency of the S-CPU 18 is 2.68 MHz (or 3.58 MHz). In other words, since the same CPU core is utilized, the S-CPU 18 and the C-CPU 34 operate with the same architecture. That is, the S-CPU 18 and the C-CPU 34 have program compatibility; however, the operation speed of the C-CPU 34 is four times the operation frequency of the S-CPU 18 at maximum. A cycle time of the S-CPU 18 which is an 8-bit CPU is approximately 372 nsec. at 2.68 MHz, and a cycle time of the C-CPU 34 which is an 8-bit CPU is approximately 93 nsec. at 10.37 MHz. On the other hand, the access time of the M-ROM 22 is approximately 120 nsec. at 16-bit width as described above, and therefore, the access time of the M-ROM 22 is shorter than the cycle time of the C-CPU 34 at 8-bit width. Therefore, in the embodiment described in the following, by utilizing such a time difference, a time of 186 nsec. being enough to access the M-ROM 22 and read-out the program data therefrom is assigned to the S-CPU 18, and a time of 186 nsec. is likewise assigned to the C-CPU 34, and accordingly, the S-CPU 18 and the C-CPU 34 can access the M-ROM 22 in substantially the same time. Thus, the time of 186 nsec. assigned to the C-CPU 34 is two times the cycle time of the C-CPU 34, and therefore, the C-CPU 34 operates twice during the time of 186 nsec.

Figure 4:
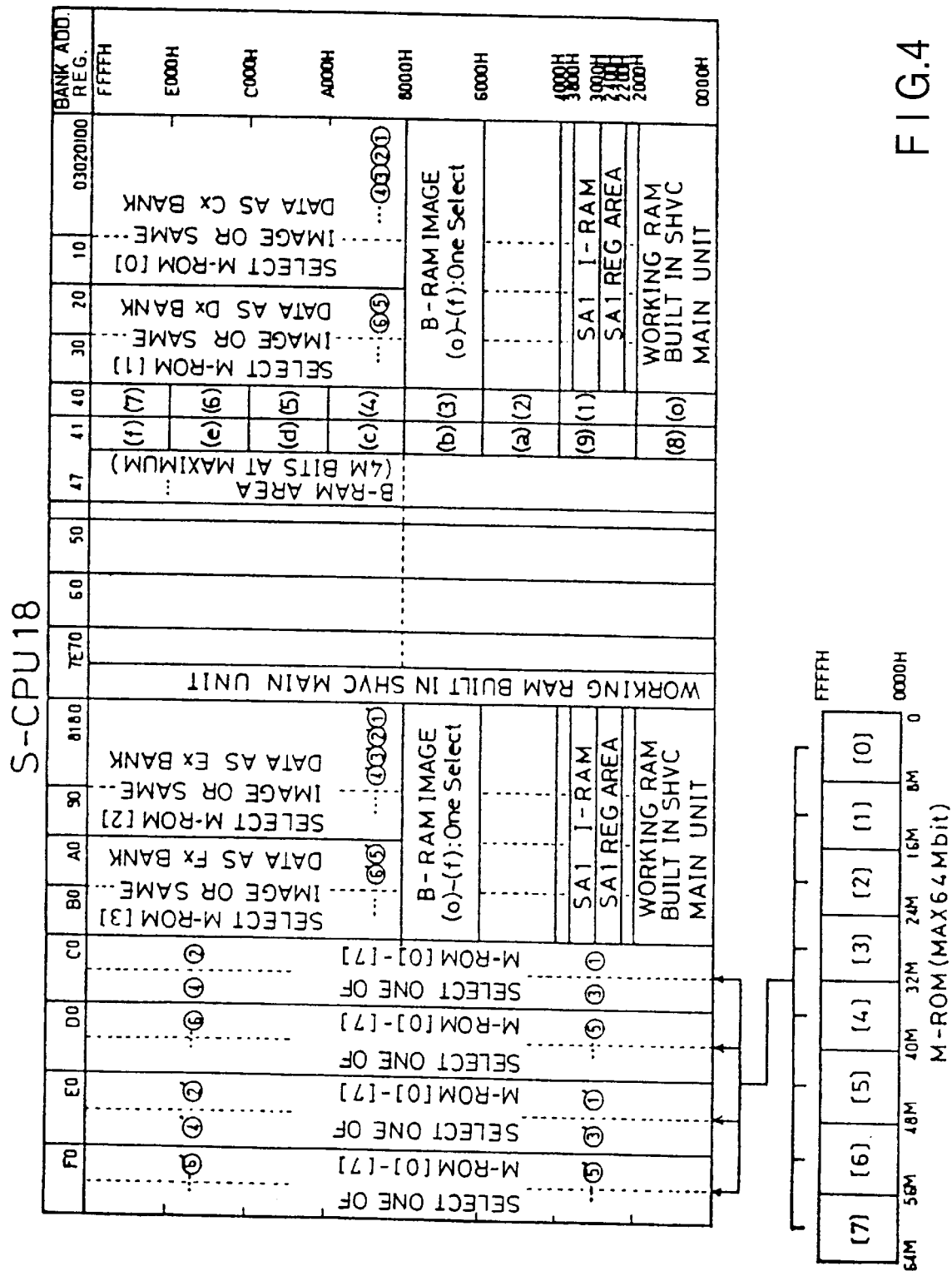
FIG. 4 is an illustrative view showing a memory map for an S-CPU of FIG. 3 embodiment.

In addition, in the game system 10 of this embodiment shown, the S-CPU 18, the W-RAM 24, and the co-processor 30, i.e., the C-CPU 34, are coupled to each other by an address bus 38, and the S-CPU 18, the PPU 20, the W-RAM 24, and the co-processor 30, i.e., the C-CPU 34 are coupled to each other by a data bus 40. The co-processor 30, i.e., the C-CPU 34 and the M-ROM 22 are connected to each other by an address bus 42 and a data bus 44, and the co-processor 30, i.e., the C-CPU 34 and the B-RAM 32 are coupled to each other by an address bus 46 and a data bus 48. The address bus 38 is 24 bits, the data bus 40 is 8 bits, the address bus 42 is 23 bits, the data bus 44 is 16 bits, the address bus 46 is 19 bits, and the data bus 48 is 8 bits. Then, the S-CPU 18 and the C-CPU 34 access the M-ROM 22 or the B-RAM 32 via the same access control circuit 35. Therefore, as shown in FIG. 4 and FIG. 5, the same address space of 24 bits, for example, is assigned to the S-CPU 18 and C-CPU 34 except an address space of the W-RAM 24 which can be accessed by only the S-CPU 18. Furthermore, although each of the CPUs is 8 bits as described above, the same has the address space of 24 bits by utilizing a bank switching or changing technology. More specifically, in FIG. 4, a memory map for the S-CPU 18 is shown, and in FIG. 5, a memory map for the C-CPU 34 is shown; however, the two memory maps are the same. However, an address mapping for the I-RAM 36 is slightly different for the S-CPU 18 and for the C-CPU 34. In this embodiment shown, the S-CPU 18 can access the I-RAM 36 with "3000h–37FFh", but the C-CPU 34 can access the I-RAM 36 with "0000h–07FFh" and "3000h–37FFh". In addition, "**" is "00h–3Fh" bank and "80h–BFh" bank.

In addition, the accesses to the memories 22, 32 and 36 by the S-CPU 18 and the accesses to the memories 22, 32 and 36 by the C-CPU 34 are controlled by the access control circuit 35 which receives the signal SSYNC (SSSYNC) from the clock generator 216. The access control circuit 35 includes an M-ROM sequencer 54, a B-RAM sequencer 98 and an I-RAM sequencer 100 (described later); however, an operation of the circuit will be described later.

Figure 6:
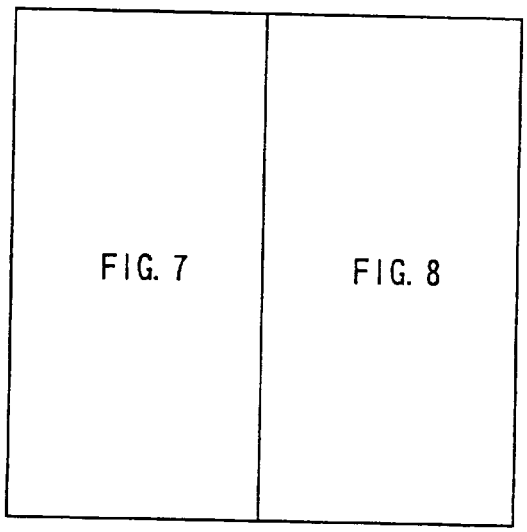
FIG. 6 is a block diagram showing a co-processor in FIG. 3 embodiment.
Figure 7:
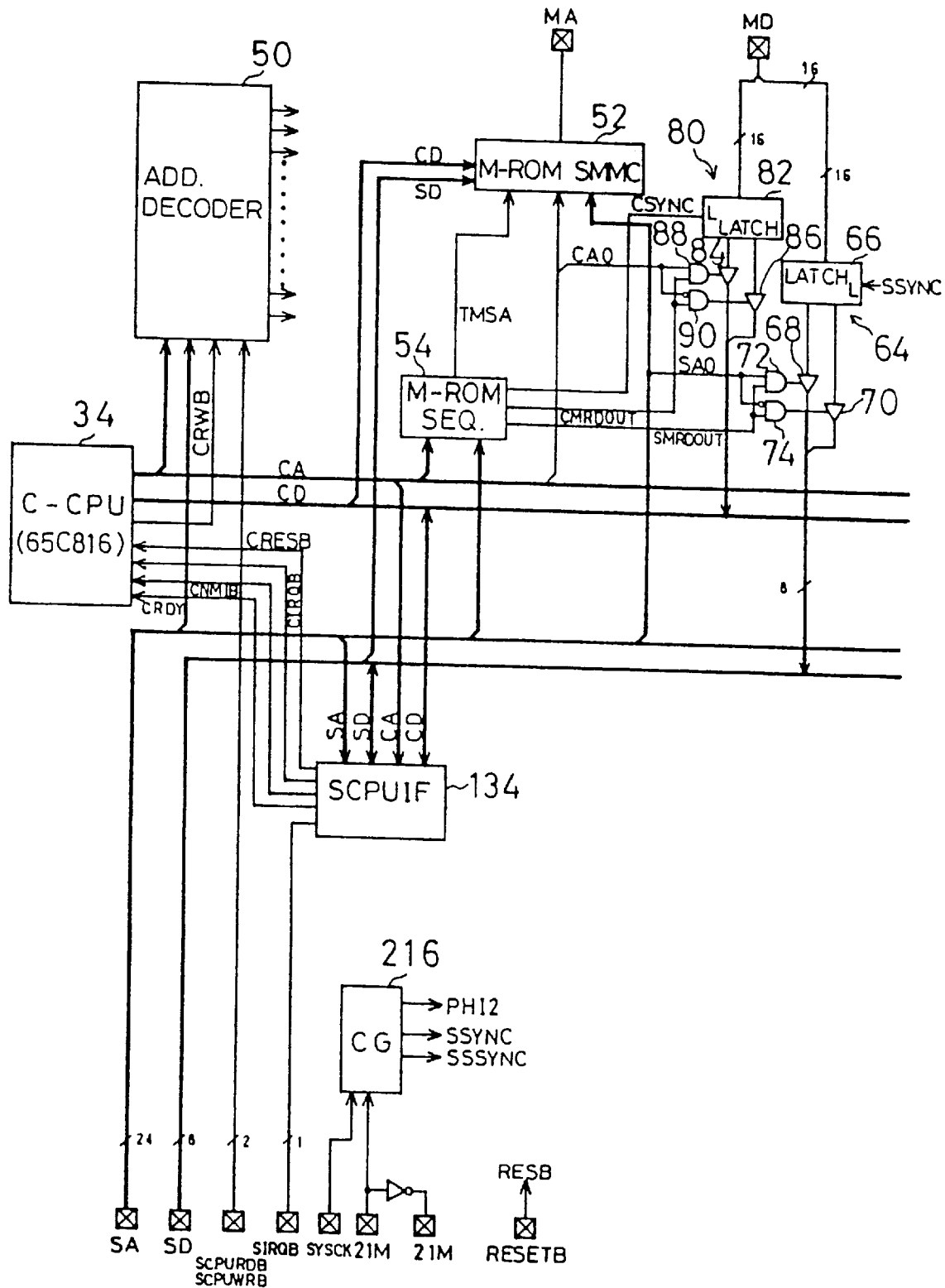
FIG. 7 is a block diagram showing in detail a portion of the co-processor in FIG. 3 embodiment.
Figure 8:
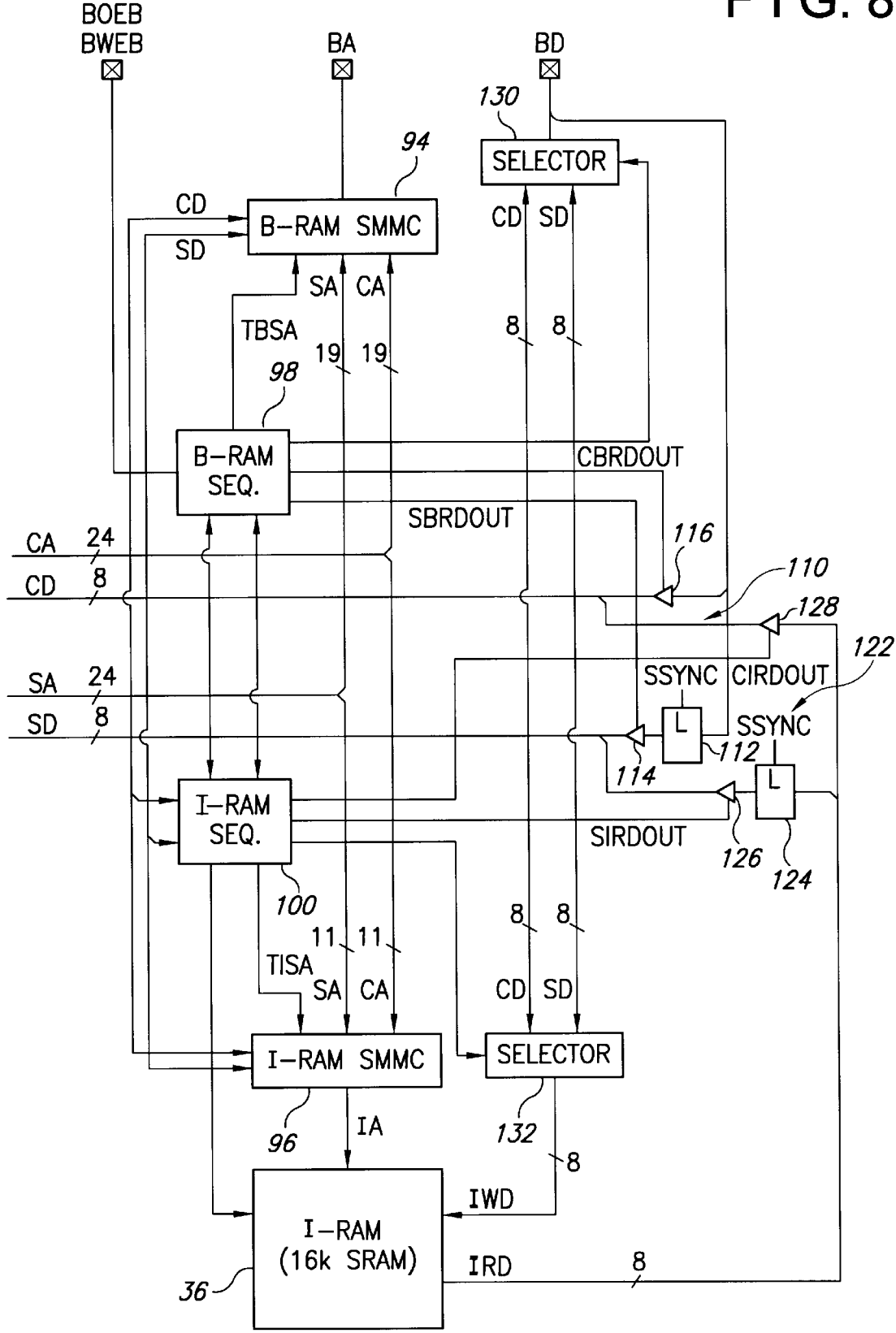
FIG. 8 is a block diagram showing in detail other portions of the co-processor in FIG. 3 embodiment.

FIG. 6 to FIG. 8 are block diagrams of the co-processor 30 which includes an address decoder 50 coupled to the C-CPU 34. The address decoder 50 decodes addresses of the S-CPU 18 and the C-CPU 34. Therefore, the address decoder 50 receives address data SA from the S-CPU 18 and address data CA from the C-CPU 34. Outputs of the address decoder 50 are utilized as enable signals or clock for a various kinds of registers or the like as described later. In addition, the address decoder 50 receives from the C-CPU 34 a signal CRWB ("B" means inversion: bar, hereinafter) for reading-out the program data by the C-CPU 34 from the M-ROM 22.

An M-ROMSMMC 52 changes banks of the M-ROM 22 (FIG. 3), and changes the accesses by the S-CPU 18 and the C-CPU 34. To this end, the M-ROMSMMC 52 receives the address data SA from the S-CPU 18 and the address data CA from the C-CPU 34, and data SD from the S-CPU 18 and data CD from the C-CPU 34, and further a signal TMSA from the M-ROM sequencer 54.

Figure 18:
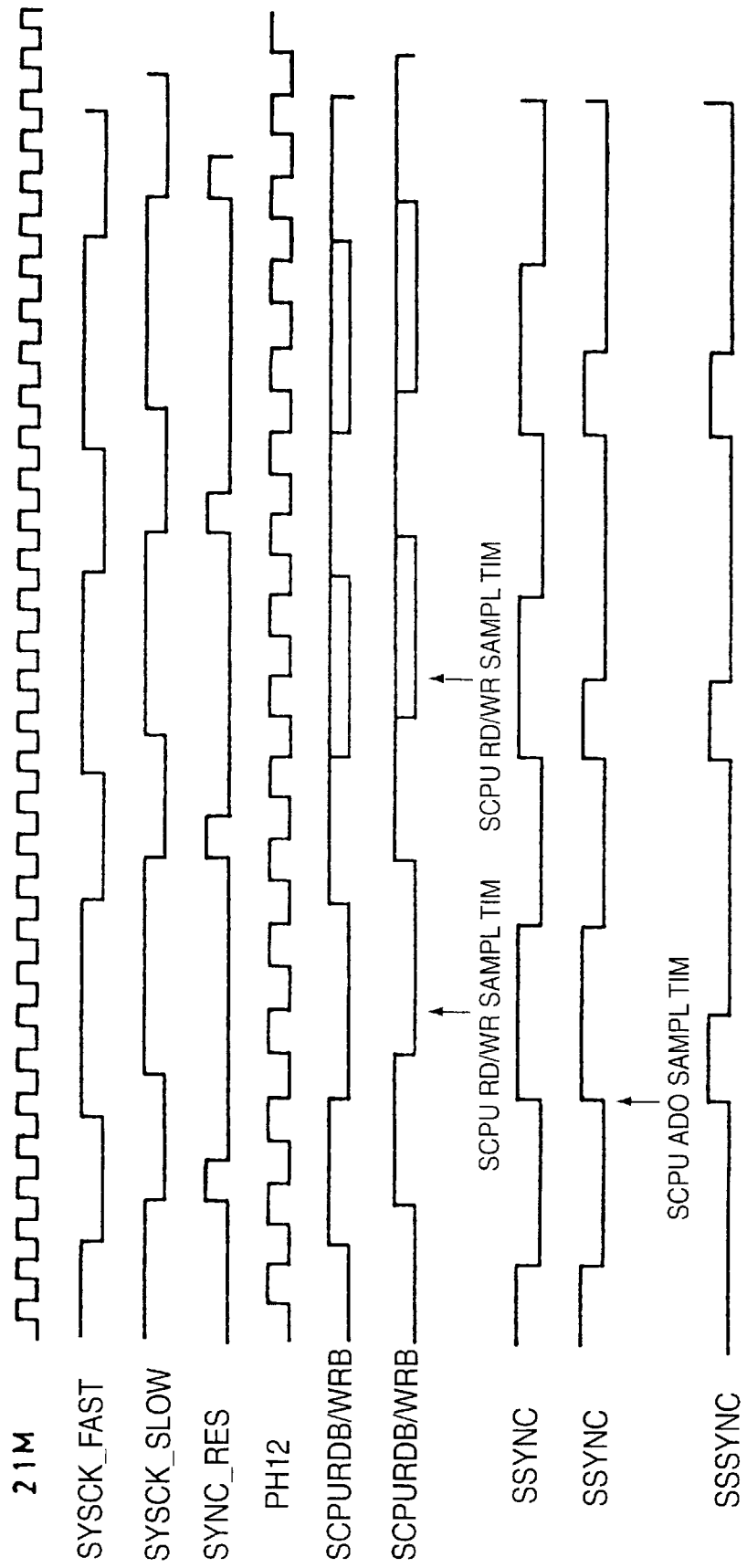
FIG. 18 is an illustrative view showing one example of a set of timing signals or clock signals generated by the clock generator of FIG. 17 embodiment.
Figure 19:
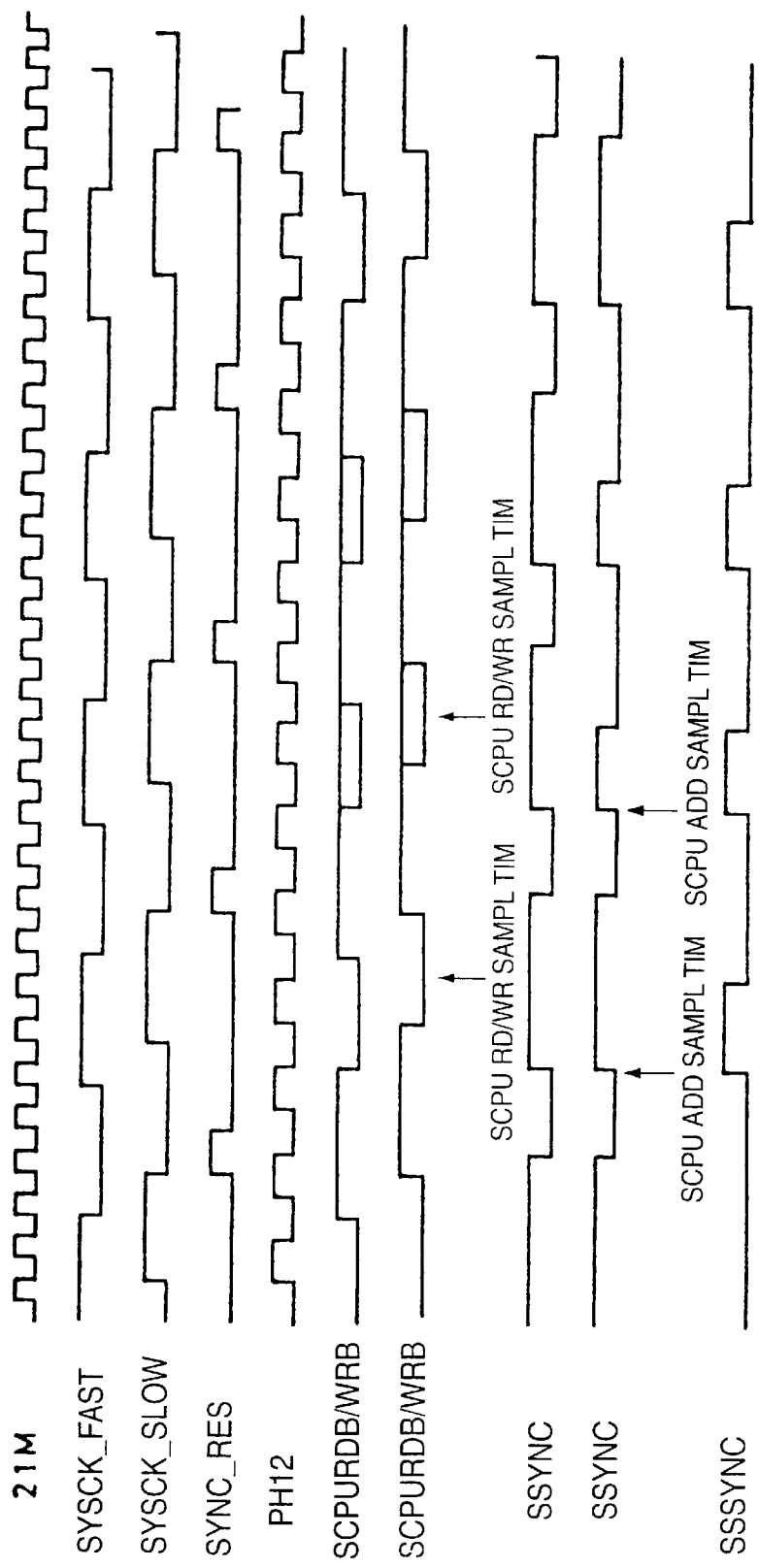
FIG. 19 is an illustrative view showing another example of a set of the timing signal or the clock signal generated by the clock generator of FIG. 17 embodiment.

The M-ROM sequencer 54 included in the access control circuit 35 shown in FIG. 3 includes address decoders 56 and 58 as shown in FIG. 9 in detail. The address decoder 56 decodes the address data SA from the S-CPU 18, and if the address data SA hits an address by which the M-ROM 22 shown in FIG. 4 is to be accessed, outputs a signal SMHIT of a high level. The address decoder 58 decodes the address data CA from the C-CPU 34, and if the address data CA hits an address by which the M-ROM 22 shown in FIG. 5 is to be accessed, outputs a signal SMHIT of a high level. The signal CMHIT is applied to one input of an AND gate 60 having other input to which a timing signal SSYNC (described later: FIG. 18 or FIG. 19) which is decided for accessing the M-ROM 22 by the S-CPU 18. An output of the AND gate 60 is applied to the above described M-ROMSMMC 52 as the signal TMSA. Therefore, in the M-ROMSMMC 52, when the signal TMSA is a high level, the address SA from the S-CPU 18 is enabled, and if the signal TMSA is a low level, the address from the C-CPU 34 is enabled. The address SA or CA thus enabled is applied to an address input MA (FIG. 7) of the M-ROM 22.

The output of the address decoder 56 is also applied to one input of an AND gate 62, and the AND gate 62 has other input which receives a signal SCPURDB which becomes a low level when the M-ROM 22 is read by the S-CPU 18. An output signal SMRDOUT of the AND gate 62 becomes, therefore, a high level at a time that the M-ROM 22 is to be read by the S-CPU 18. The signal SMRDOUT is applied to a latch/buffer 64 (FIG. 7) which inputs the program data outputted from the data output AND to a data bus SD of the S-CPU 18. The latch/buffer 64 shown in FIG. 7 includes a latch 66 coupled to the data output MD, receives the aforementioned signal SSYNC as a latch signal. Upper 8 bits and lower 8 bits of the latch 66 are respectively applied to tri-state buffers 68 and 70. Control inputs for the tri-state buffers 68 and 70, outputs of AND gates 72 and 74 are applied, respectively. The above described signal SMRD-OUT is applied to respective one inputs of the AND gate 72 and 74, and to other inputs of the AND gate 72, at least significant bit SA0 of the address SA of the S-CPU 18 is applied, and an inversion of the least significant bit SA0 is applied to other input of the AND gate 74. Therefore, when the least significant bit SA0 is a low level, the lower 8 bits MD0–MD7 of the data from the M-ROM 22 is outputted from the tri-state buffer 70, and if the least significant bit SA0 is a high level, the upper 8 bits MD8–MD15 of the data from the M-ROM 22 is outputted from the tri-state buffer 68, and the data are respectively inputted to the data bus SD of the S-CPU 18.

In FIG. 9, the above described signal CMHIT is applied to a NAND gate 76, and the signal TMSA from the above described AND gate 60 is applied to other input of the NAND gate 76. An output of the NAND gate 76 becomes a signal RDY which functions as a signal for stopping the C-CPU 34. That is, when the signal RDY is at a low level, the C-CPU 34 is brought into a waiting state. Therefore, when the C-CPU 34 and the S-CPU 18 both access the M-ROM 22, the signal RDY becomes a low level, and applied to the C-CPU 34 as a signal CRDY. In response thereto, the C-CPU 34 becomes the waiting state. Accordingly, if the S-CPU 18 and the C-CPU 34 simultaneously access the M-ROM 22 or the B-RAM 32, the C-CPU 34 becomes the waiting state, and the access by the S-CPU 18 is handled with a priority. Then, after the access by the S-CPU 18 is terminated, the waiting state of the C-CPU 34 is released, and therefore, it becomes possible for the C-CPU 34 to access the M-ROM 22 or the B-RAM 32. Therefore, it is possible to perform a non-synchronous 2-phase access to the M-ROM 22 or the B-RAM 32 by the S-CPU 18 and the C-CPU 34, and therefore, it becomes possible for the S-CPU 18 and the C-CPU 34 to simultaneously execute the program stored in a single memory, i.e., the M-ROM 22.

Furthermore, an inversion of the signal TMSA from the AND gate 60, the signal CMHIT from the address decoder 58, and the signal CRWB, which becomes a high level at a time that the M-ROM 22 is to be read by C-CPU 34, are applied to respective inputs of an AND gate 78. Therefore, at a time that the S-CPU 18 does not access the M-ROM 22, in response to the signal CMHIT, a signal CMRDOUT which becomes a high level at a time that the data of the M-ROM 22 to be read by the C-CPU 34 is outputted from the AND gate 78. The signal CMRDOUT is applied to a latch/buffer 80 (FIG. 7) for inputting the program data from the M-ROM 22 to the data bus CD of C-CPU 34. The latch/buffer 80 shown in FIG. 7 includes a latch 82 coupled to the data output MD of the M-ROM 22, and a signal CSYNC (described later) is applied to the latch 82 as a latch signal thereof. Upper 8 bits and lower 8 bits of the latch 82 are applied to tri-state buffers 84 and 86, respectively. As control inputs for the tri-state buffers 84 and 86, outputs of AND gates 88 and 90 are respectively applied. The above described signal CMRDOUT is applied to respective one inputs of the AND gates 88 and 90, and a least significant bit CA0 of the address CA of the C-CPU 34 is applied to other input of the AND gate 88, and an inversion of the least significant bit CA0 is applied to other input of the AND gate 90. Therefore, at a time that the least significant bit CA0 is a low level, the lower 8 bits MD0–MD7 of the data from the M-ROM 22 is outputted from the tri-state buffer 86, and when the least significant bit CA0 is a high level, the upper 8 bits MD8–MD15 of the data from the M-ROM 22 is outputted from the tri-state buffer 84, and the data are respectively inputted to a data bus CD of the C-CPU 34.

The aforementioned signal CSYNC is a signal indicating a timing that the data is read from the M-ROM 22 by the C-CPU 34 and the data as read is to be latched by the latch 82, and the signal is outputted from an AND gate 92. That is, the signal CRWB, the signal CMHIT, the inversion of the least significant bit CA0 of the address CA, and a clock signal PH12 are applied to four inputs of the AND gate 92. The clock signal PH12 has a frequency for the C-CPU 34 as shown in FIG. 18 or FIG. 19, and is a clock of 10.73 MHz, for example. Therefore, the signal CSYNC is outputted as a high level at a time that the C-CPU 34 accesses the M-ROM 22, and when the signal CSYNC is a low level, the latch 82 latches the program data of 16 bits being applied from the data bus MD of the M-ROM 22.

As seen from memory maps shown in FIG. 4 and FIG. 5, the S-CPU 18 and the C-CPU 34 share all areas of the M-ROM 22, and therefore, the both can access the M-ROM 22 non-synchronously at arbitrary timings. At that time, a device which mediates the accesses to the M-ROM 22 is the M-ROM sequencer 54. When the signal TMSA is outputted from the AND gate 60 of the M-ROM sequencer 54 shown in FIG. 9, the address SA of the S-CPU 18 is enabled in the M-ROMSMMC 52 shown in FIG. 8. Therefore, in such a case, when the C-CPU 34 hits the address of the M-ROM 22, the signal RDY is outputted from the NAND gate 76, and therefore, as shown in FIG. 10(B) or FIG. 10(C), the C-CPU 34 waits for the access to the M-ROM 22 during a time that the signal TMSA is a high level. Therefore, the C-CPU 34 can access the M-ROM 22 at a time that the signal TMSA becomes a low level and the signal RDY is a high level. Thus, as shown in FIG. 10(C), the S-CPU 18 and the C-CPU 34 can access the M-ROM 22 in a non-synchronous 2-phase manner.

In a case where the M-ROM 22 is accessed by only the C-CPU 34 as shown in FIG. 10(A), the operation frequency of the C-CPU 34 is 10.73 MHz due to the clock signal PH12. However, in a case where the M-ROM 22 is accessed by the S-CPU 18 and the C-CPU 34 in two phases as shown in FIG. 10(B) or FIG. 10(C), during a time that the S-CPU 18 accesses the M-ROM 22, the operation frequency of the C-CPU 34 becomes 5.37 MHz because the C-CPU 34 is brought into the waiting state. In addition, the operation frequency of the S-CPU 18 is made to be 2.68 MHz always due to the system clock signal SYSCK.

A B-RAMSMMC 94 and an I-RAMSMMC 96 shown in FIG. 8 both play functions as similar to that of the aforementioned M-ROMSMMC 52. More specifically, the B-RAMSMMC 94 changes bank of the B-RAM 32 (FIG. 3), and changes the accesses of the S-CPU 18 and the C-CPU 34. To this end, the B-RAMSMMC 94 receives not only the address data SA of the S-CPU 18, the address data CA of the C-CPU 34, the data SD of the S-CPU 18 and the data CD of the C-CPU 34 but also a signal TBSA from a B-RAM sequencer 98.

The I-RAMSMMC 96 changes bank of the I-RAM 36 (FIG. 3), and changes the accesses of the S-CPU 18 and the C-CPU 34. To this end, the I-RAMSMMC 96 receives not only the address data SA of the S-CPU 18, the address data CA of the C-CPU 34, the data SD of the S-CPU 18 and the data CD of the C-CPU 34 but also a signal TISA from a I-RAM sequencer 100.

Figure 11:
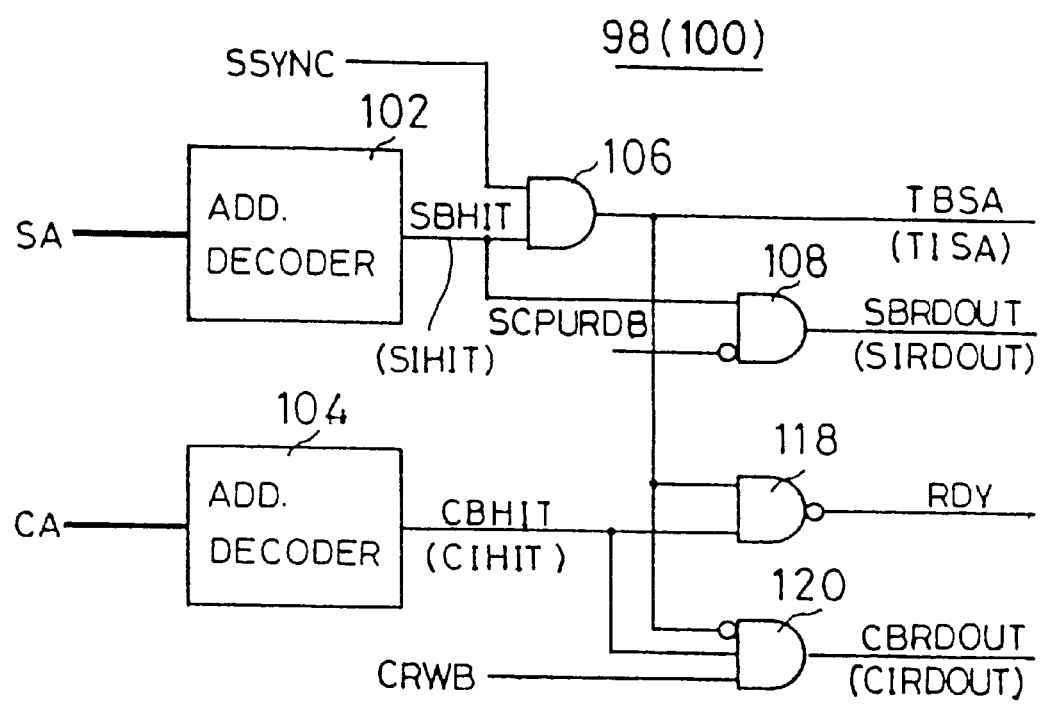
FIG. 11 is a block diagram showing in detail a B-RAM sequencer (I-RAM sequencer) in FIG. 7 embodiment.

The B-RAM sequencer 98 included in the access control circuit 35 in FIG. 3 has the same circuit configuration as that of an I-RAM sequencer 10, and as shown in FIG. 11 in detail, includes address decoders 102 and 104. The address decoder 102 decodes the address data SA of the S-CPU 18, and when the address data SA hits an address at which the B-RAM 32 is to be accessed, outputs a signal SBHIT of a high level. The address decoder 104 decodes the address data CA of the C-CPU 34, and when the address data CA hits an address at which the B-RAM 32 is to be accessed, outputs a signal CBHIT of a high level. The signal SBHIT is applied to one input of an AND gate 106 which receives at other input thereof the aforementioned timing signal SSYNC for determining a timing that the S-CPU 108 can access the B-RAM 32. An output of the AND gate 106 is applied to the B-RAMSMMC 94 as the signal TBSA. Therefore, a timing that the signal TBSA is a high level is a timing that the B-RAM 32 is accessed by the S-CPU 18. More specifically, when the signal TBSA is a high level, the B-RAMSMMC 94 applies the address SA from the S-CPU 18 to an address input BA of the B-RAM 32, and at a timing of a low level, the address CA from the C-CPU 34 is applied to the address input BA.

The output of the address decoder 102 is also applied to one input of an AND gate 108 having other input which receives a signal SCPURDB which becomes a low level at a timing that the B-RAM 32 is read-out by the S-CPU 18. An output signal SBRDOUT of the AND gate 108 becomes, therefore, a high level at a timing that the B-RAM 32 is to be read-out by the S-CPU 18, and a low level at a timing that the data is to be written in the B-RAM 32.

The signal SBRDOUT is applied to a latch/buffer 110 (FIG. 8) for inputting the data from a data terminal BD to the data bus SD of the S-CPU 18. The latch buffer 110 shown in FIG. 8 includes a latch 112 coupled to the data terminal BD, and as a latch signal for the latch 112, the aforementioned signal SSYNC is applied. The latch 112 receives output data of 8 bits from the B-RAM 32, and latches the same in response to the signal SSYNC. An output of the latch 112 is applied to a tri-state buffer 114. Furthermore, output data of 8 bits from the B-RAM 32 is applied to a tri-state buffer 116 as it is. As control inputs for the tri-state buffers 114 and 116, the signal SBRDOUT and a signal CBRDOUT (described later) from the B-RAM sequencer 98 are applied. Therefore, at a time that the signal SBRDOUT is at a high level, the output data from the B-RAM 32 is outputted by the tri-state buffer 114. Likewise, at a time that the signal CBRDOUT is at a high level, the output data from the B-RAM 32 is outputted from the tri-state buffer 116. The output data are respectively inputted to the data bus SD of the S-CPU 18 and the data bus CD of the C-CPU 34.

The above described signal CMHIT shown in FIG. 11 is applied to one input of an AND gate 118, and the signal TBSA from the above described AND gate 106 is applied to other input of the AND gate 118. An output of the AND gate 106 becomes the signal RDY which functions as a signal for stopping the C-CPU 34. That is, at a time that the signal RDY is a low level, the C-CPU 34 is brought into the waiting state. Therefore, during a time that the C-CPU 34 and the S-CPU 18 both access the B-RAM 32, the signal RDY becomes a low level and applied to the C-CPU 34 as a signal CRDY. In response thereto, the C-CPU 34 is brought into the waiting state.

Furthermore, an inversion of the TBSA from the AND gate 106, the signal CBHIT from the address decoder 104, and the signal CRWB which becomes a low level at a time that the C-CPU 34 writes data and a high level at a time that the C-CPU 34 reads data are applied to three inputs of an AND gate 120. Therefore, at a time that the S-CPU 18 does not access the B-RAM 32, in response to the signal CBHIT, the signal CBRDOUT of a high level is outputted from the AND gate 120. As described above, the signal CBRDOUT is applied to the control signal for the tri-state buffer 116.

As described above, the I-RAM sequencer 100 is similar to the B-RAM sequencer 98, therefore, a detailed description of the I-RAM sequencer 100 will be omitted here. However, in FIG. 11, signals applied to a circuit of FIG. 11 and signals outputted from the circuit at a time that the circuit is utilized as the I-RAM sequencer 100 are shown in brackets.

A signal SIRDOUT from the I-RAM sequencer 100 included in the access control circuit 35 of FIG. 3 includes a latch/buffer 122 (FIG. 8) for inputting data from the I-RAM 36 to the data bus SD of the S-CPU 18. The latch/buffer 122 shown in FIG. 8 includes a latch 124 which receives read data IRD from the I-RAM 36, and as a latch signal for the latch 124, the aforementioned signal SSYNC is applied. The latch 124 receives output data 8 bits from the I-RAM 36, and latches the same in response to the signal SSYNC. An output of the latch 124 is applied to a tri-state buffer 126. Furthermore, output data of 8 bits from the I-RAM 36 is applied to a tri-state buffer 128 as it is. As control inputs for the tri-state buffers 126 and 128, the signal SIRDOUT and a signal CIRDOUT from the I-RAM sequencer 100 are applied. Therefore, at a time that the signal SIRDOUT is a high level, the output data from the I-RAM 36 is outputted by the tri-state buffer 126. Likewise, at a time that the signal CIRDOUT is a high level, the output data from the I-RAM 36 is outputted from the tri-state buffer 128. The output data are respectively inputted to the data bus SD of the S-CPU 18 and the data bus CD of the C-CPU 34.

Data to be written in the B-RAM 32 and the I-RAM 36 are respectively selected by selectors 130 and 132. More specifically, the selector 130 receives the data of 8 bits from the data bus SD of the S-CPU 18 and the data of 8 bits from the data bus CD of the C-CPU 34. The signal RDY from the B-RAM sequencer 98 is applied to the selector 130 as a selection signal. That is, when the signal RDY is a low level, the selector selects and applies the data to be written from the S-CPU 18 to the B-RAM 32, and when the signal RDY is a high level, the selector 130 selects and applies the data to be written from the C-CPU 34 to the B-RAM 32. In a similar manner, the selector 132 receives the data of 8 bits from the data bus SD of the S-CPU 18 and the data of 8 bits from the data bus SD of the C-CPU 34. As a selection signal for the selector 132, the signal RDY from the I-RAM sequencer 100 is applied. That is, when the signal RDY is a low level, the selector 132 selects and applies the data to be written from the S-CPU 18 to the I-RAM 36, and the data to be written from the C-CPU 34 is selected and applied to the I-RAM by the selector 132 at a time that the signal RDY is a high level.

The S-CPU 18 and the C-CPU 34 share all areas of the B-RAM 32 as seen from the memory maps of FIG. 4 and FIG. 5, and can non-synchronously access the B-RAM 32 at arbitrary timings. At that time, a device for mediating the accesses to the B-RAM 32 is the B-RAM sequencer 98. If the signal TBSA of a high level is outputted from the AND gate 106 of the B-RAM sequencer 98 shown in FIG. 11, in the B-RAMSMMC 94 shown in FIG. 8, the address SA from the S-CPU 18 is enabled. Therefore, in this case, if the C-CPU 34 hits the address of the B-RAM 32, the signal RDY is outputted from the AND gate 118, and therefore, as shown in FIG. 12(B) or FIG. 12(C), during a time that the signal TMSA is a high level, the C-CPU 34 waits for the access to the B-RAM 32. Accordingly, the C-CPU 34 can access the B-RAM 32 at a time that the signal RDY is a low level and the signal TMSA is a low level. Thus, the S-CPU 18 and the C-CPU 34 can completely access the B-RAM 32 in the 2-phase manner.

In addition, in a case where the B-RAM 32 is accessed by only the C-CPU 34 as shown in FIG. 12(A), the operation frequency of the C-CPU 34 is 5.37 MHz due to the clock signal PH12. However, in a case where the B-RAM 32 is accessed by the S-CPU 18 and the C-CPU 34 in two phases as shown in FIG. 12(B) or FIG. 12(C), the operation frequency of the C-CPU 34 becomes 2.68 MHz. In addition, the operation frequency of the S-CPU 18 is made to be 2.68 MHz always due to the system clock signal SYSCK.

Likewise, as seen from memory maps shown in FIG. 4 and FIG. 5, the S-CPU 18 and the C-CPU 34 share all areas of the I-RAM 36, and therefore, the both can access the I-RAM 36 non-synchronously at arbitrary timings. At that time, a device which mediates the accesses to the I-RAM 36 is the I-RAM sequencer 100. When the signal TISA is outputted from the AND gate 106 of the I-RAM sequencer 100 shown in FIG. 11, the address SA of the S-CPU 18 is enabled in the I-RAMSMMC 96 shown in FIG. 8. Therefore, in such a case, when the C-CPU 34 hits the address of the I-RAM 36, the signal RDY is outputted from the NAND gate 118, and therefore, as shown in FIG. 13(B) or FIG. 13(C), the C-CPU 34 waits for the access to the I-RAM 36 during a time that the signal TISA is a high level. Therefore, the C-CPU 34 can access the I-RAM 36 at a time that the signal TISA becomes a low level and the signal RDY is a high level. Thus, as shown in FIG. 13(B), the S-CPU 18 and the C-CPU 34 can access the I-RAM 36 in a non-synchronous 2-phase manner.

In the case where the I-RAM 36 is accessed by only the C-CPU 34 as shown in FIG. 13(A), the operation frequency of the C-CPU 34 is 10.73 MHz due to the clock signal PH12. However, in a case where the I-RAM 36 is accessed by the S-CPU 18 and the C-CPU 34 in two phases as shown in FIG. 13(B) or FIG. 13(C), the operation frequency of the C-CPU 34 becomes 5.37 MHz. However, the operation frequency of the S-CPU 18 is made to be 2.68 MHz always due to the system clock signal SYSCK.

Returning back to FIG. 7, the SCPUIF 134 applies interrupts IRQ between the S-CPU 18 and the C-CPU 34 from and to each other, or reset signals and an interrupt NMI from the S-CPU 18 to the C-CPU 34 or vectors between the S-CPU 18 and the C-CPU 34 from and to each other. Therefore, the SCPUIF 134 receives the address SA and the data SD of the S-CPU 18 and the address CA and the data CD of the C-CPU 34.

Figure 14:
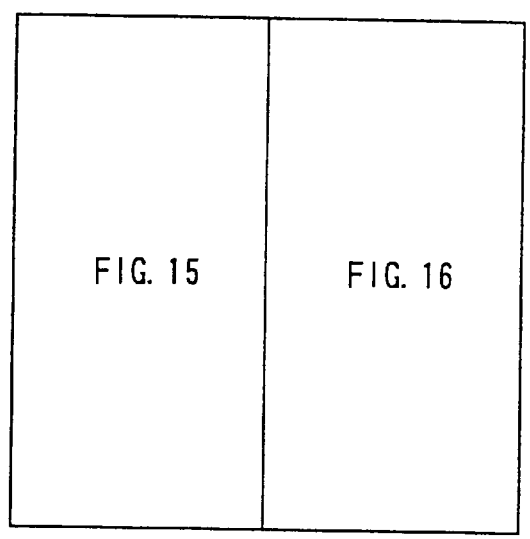
FIG. 14 is a block diagram showing an SCPUIF in FIG. 7 embodiment.
Figure 15:
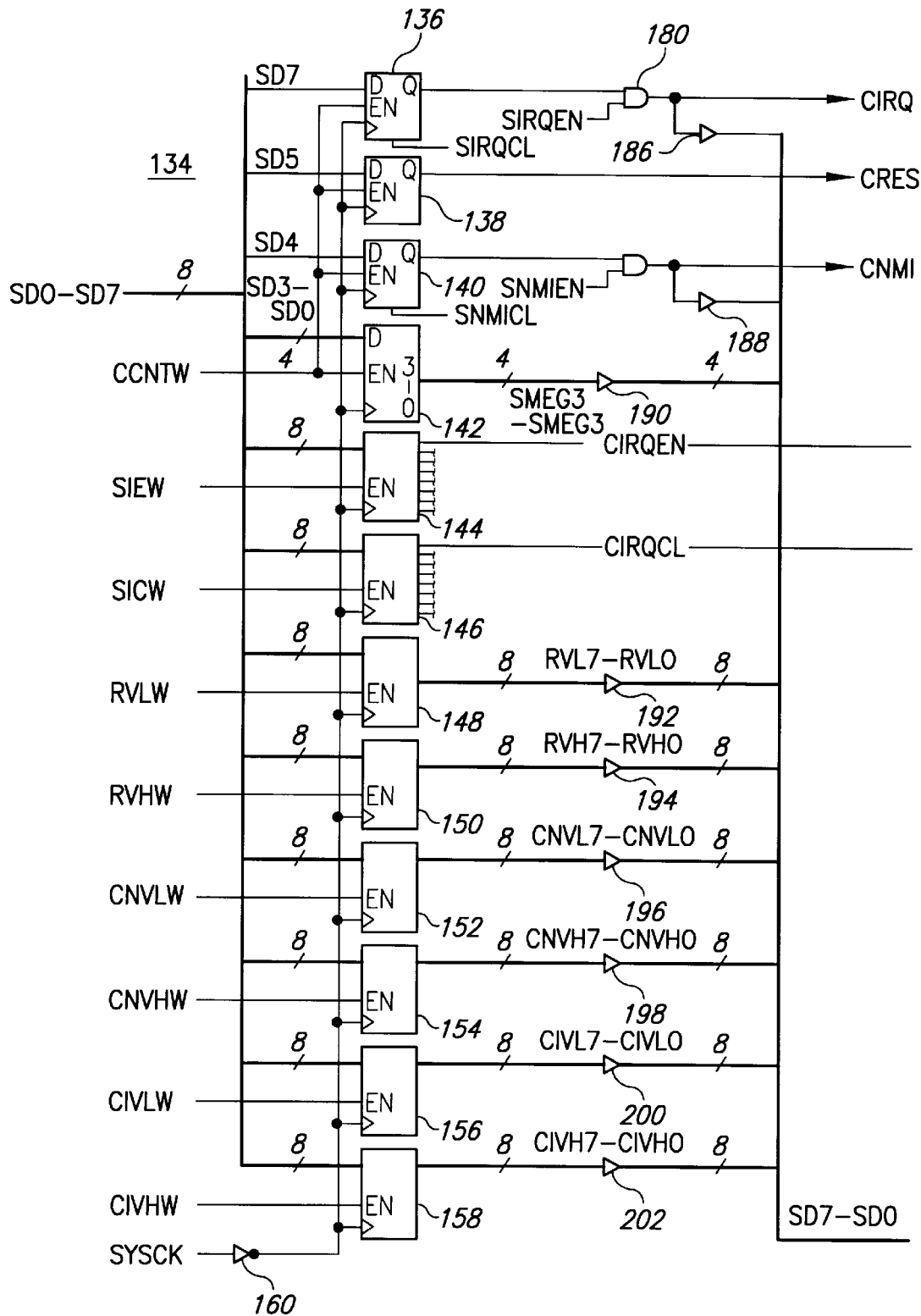
FIG. 15 is a block diagram showing in detail a portion of the SCPUIF in FIG. 7 embodiment.

The SCPUIF 134 is shown in FIG. 14 to FIG. 16 in detail. As shown in FIG. 15, the SCPUIF 134 induces a C-CPU control register 136 which receives a most significant bit SD7 of lower 8 bits SD0–SD7 of the data SD of the S-CPU 18, a C-CPU control register 138 which receives a bit SD5 at a third bit from the most significant bit, a C-CPU control register 140 which receives a bit SD4 at a fourth bit from the most significant bit, and a C-CPU control register 142 which receives lower 4 bits SD3–SD0. The SCPUIF 134 further includes decoders 144 and 146, and vector registers 148, 150, 152, 154, 156 and 158 each of which receives all bits of the data SD0–SD7. As a clock for all of the C-CPU control registers, the decoders and the vector registers 136–158, the system clock SYSCK for the S-CPU 18 from the clock generator 216 is inverted by inverter 160 and applied to the above elements.

As enable signals for the C-CPU control registers 136–142, a timing signal CCMTW which is outputted from the address decoder 50 shown in FIG. 7 and for writing control signals for controlling C-CPU 34 by the S-CPU 18 is applied. As enable signals for the decoders 144 and 146, timing signals SIFW and SICW which are outputted from the address decoder 50 shown in FIG. 7 and for writing control signals for controlling the interrupt by the S-CPU 18 are applied. As enable signals for the reset vector registers 148 and 150, timing signals RVLW and RVHW which are outputted from the address decoder 50 of FIG. 7 and for writing reset vectors by the S-CPU 18 are applied. As enable signals for the NMI vector registers 152 and 154, timing signals CNVLW and CNVHW which are outputted from the address decoder 50 shown in FIG. 7 and for writing NMI vectors by the S-CPU 18 are applied. Then, as enable signals for the IRQ vector registers 156 and 158, timing signals CIVLW and CIVHW which are outputted from the address decoder 50 shown in FIG. 7 and for writing IRQ vectors by the S-CPU 18 are applied.

Furthermore, as shown in FIG. 16, the SCPUIF 134 includes a C-CPU control register 162 which receives a most significant bit CD7 of lower 8 bits CD0–CD7 of the data CD of the C-CPU 34, a C-CPU control register 164 which receives bits CD6–CD0 of lower 7 bits. The lower 8 bits of the data CD are applied to two decoders 166 and 168, and four vector registers 170, 172, 174 and 176. As a clock for all of the registers, the decoders and the vector registers 162–176, the clock signal PH12 for the C-CPU 34 from the clock generator 216 is inverted by inverter 178 and applied to the above elements.

As enable signals for the S-CPU control registers 162 and 164, a timing signal SCMTW which is outputted from the address decoder 50 shown in FIG. 7 and for writing control signals for controlling S-CPU 18 by the C-CPU 34 is applied. As enable signals for the decoders 166, timing signals CIFW and CICW which are outputted from the address decoder 50 shown in FIG. 7 and for writing control signals for controlling the interrupt from the S-CPU 18 by the C-CPU 34 are applied. As enable signals for the NMI vector registers 170 and 172, timing signals SNVLW and SNVHW which are outputted from the address decoder 50 of FIG. 7 and for writing INM vectors by the C-CPU 34 are applied. Then, as enable signals for the IRQ vector registers 174 and 176, timing signals SIVLW and SIVHW, which are outputted from the address decoder 50 shown in FIG. 7, are used for writing IRQ vectors by the C-CPU 34.

An output Q of the C-CPU control register 136 is applied to an AND gate 182 together with a signal SIRQEN which is outputted from the decoder 166 and for allowing the IRQ interrupt from the C-CPU 34 to the S-CPU 18, and from the AND gate 192, a signal CIRQ for making the IRQ interrupt from the S-CPU 18 to the C-CPU 34 is outputted. In addition, the C-CPU control register 136 is reset by a signal SIRQCL which is outputted from a decoder 168 and for terminating the IRQ interrupt from the S-CPU 18. An output Q of the C-CPU control register 138 is outputted as it is as a signal CRES for resetting the C-CPU 34 by the S-CPU 18. An output Q of a D-FF 140 is applied to an AND gate 182 together with a signal SNMIEN which outputted from the decoder 166 and for allowing the NMI interrupt from the C-CPU 34 to the S-CPU 18. A signal CNMI for making the NMI interrupt to the C-CPU 34 is outputted from the AND gate 182. In addition, the D-FF 140 is reset by a signal SNMICL which is outputted from the decoder 168 and for terminating the NMI interrupt. 4 bit signals SMEG3–SMEG0 which are applied from the S-CPU 18 to the C-CPU 34 are outputted from the C-CPU control register 142. The signal of 4 bits are utilizing for representing status of the interrupt processings. For example, by writing "0" in each of SMEG3–SMEG0 of the C-CPU control register 142 at the same time that the S-CPU 18 makes the NMI interrupt to the C-CPU 34, it is possible to notify that the NMI interrupt of 0-th is made to the C-CPU 34. By utilizing the 4 bits of SMEG3–SMEG0, it is possible to indicate numerals from 0 to 15, and therefore, it is possible for the S-CPU 18 to make the NMI interrupts of 16 kinds to the C-CPU 34. In a similar manner, if the bits SMEG3–SMEG0 are utilized in making the IRQ interrupt, it is possible to make the IRQ interrupts of 16 kinds.

An output Q of the S-CPU control register 162 is applied to an AND gate 184 together with a signal CIRQEN which is outputted from the decoder 144 and for allowing the IRQ interrupt from the S-CPU 18 to the C-CPU 34, and from the AND gate 184, a signal SIRQ for making the IRQ interrupt from the C-CPU 34 to the S-CPU 18 is outputted. In addition, the S-CPU control register 162 is reset by a signal CIRQCL, which is outputted from a decoder 144, and is used for terminating the IRQ interrupt from the C-CPU 34. 4 bit signals CMEG3–CMEG0 which are applied from the C-CPU 34 to the S-CPU 18 are outputted from the S-CPU control register 164. The signal of 4 bits are utilizing for representing status of the interrupt processings. For example, by writing "0" in each of CMEG3–CMEG0 of the S-CPU control register 164 at the same time that the C-CPU 34 makes the IRQ interrupt to the S-CPU 18, it is possible to notify that the IRQ interrupt of 0-th is made to the S-CPU 18. By utilizing the 4 bits of CMEG3–CMEG0, it is possible to indicate numerals from 0 to 15, and therefore, it is possible for the C-CPU 34 to make the IRQ interrupts of 16 kinds to the S-CPU 18. In a similar manner, if the bits CMEG3–CMEG0 are used in changing the NMI vectors of the S-CPU 18 by the C-CPU 34, it is possible to change the NMI vectors of 16 kinds.

In a similar manner, if the 4 bits CMEG3–CMED0 are utilized at a time that the C-CPU 34 changes the NMI vectors of the S-CPU 18, it is possible to change the NMI vectors of 16 kinds.

In addition, outputs of AND gates 180 and 182 and outputs of the C-CPU control register 142 are outputted as the data SD7–SD0 to the S-CPU 18 through buffers 186 and 188 and a buffer 190, respectively. Furthermore, outputs of the reset vector registers 148 and 150 are outputted to the data SD7–SD0 through buffers 192 and 194 as reset vector data RVL7–RVL0 and RVH7–RVH0. Outputs of the NMI vector registers 152 and 154 are outputted to the data SD7–SD0 through buffers 196 and 198 as NMI vector data CNVL7–CNVL0 and CNVH7–CNVH0. Outputs of the IRQ vector registers 156 and 158 are outputted to the data SD7–SD0 through buffers 200 and 202 as IRQ vector data CIVL7–CIVL0 and CIVH7–CIVH0.

Furthermore, an output of an AND gate 184 and an output of the S-CPU control register 164 are outputted as the data CD7–CD0 to the C-CPU 34 through a buffer 204 and a buffer 206, respectively. Then, outputs of the NMI vector registers 170 and 172 are outputted to the data CD7–CD0 through buffers 208 and 210 as NMI vector data SNVL7–SNVL0 and SNVH7–SNVH0. Outputs of the IRQ vector registers 174 and 176 are outputted to the data CD7–CD0 through buffers 212 and 214 as IRQ vector data SIVL7–SIVL0 and SIVH7–SIVH0.

Figure 17:
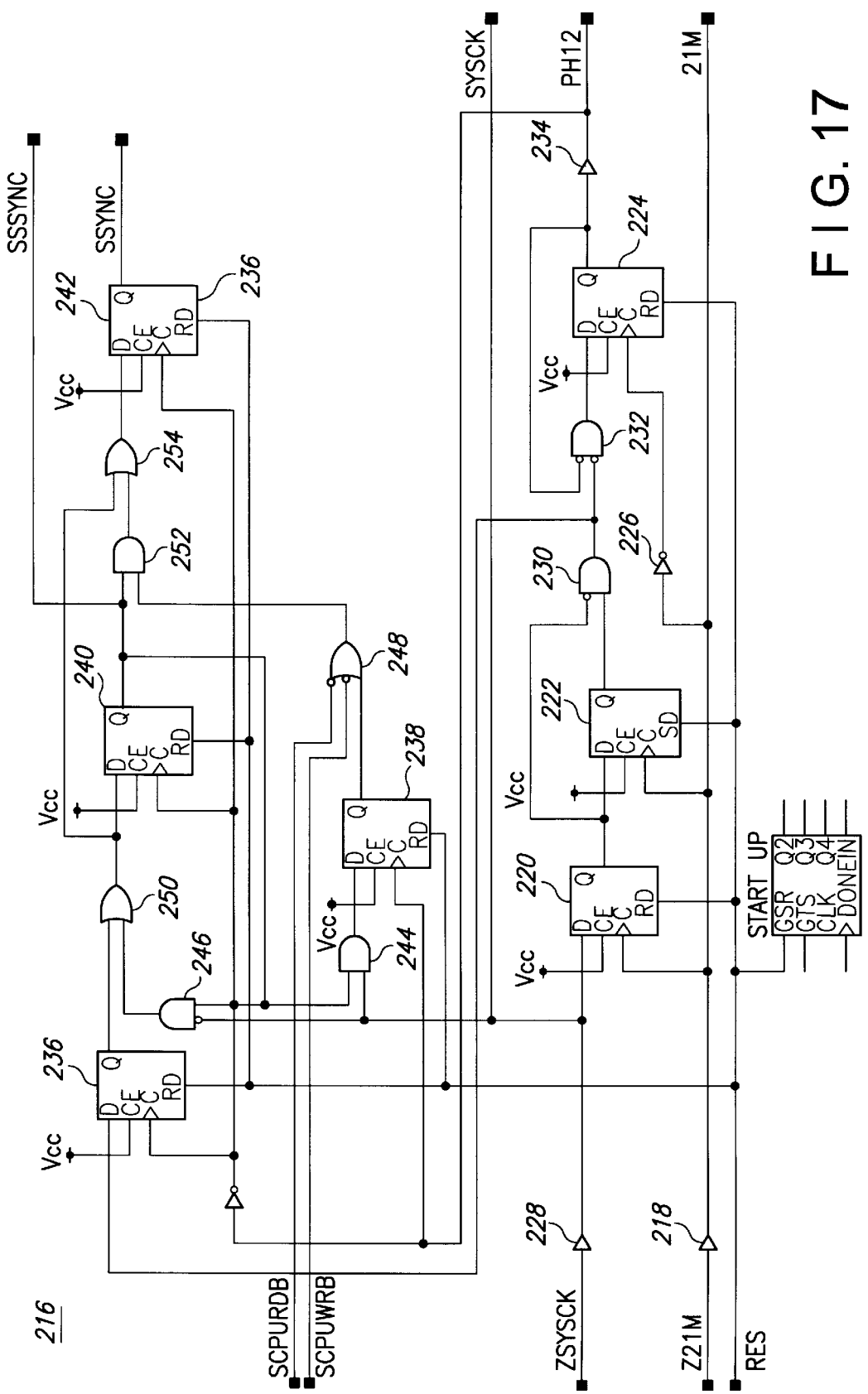
FIG. 17 is a block diagram showing in detail a clock generator in FIG. 7 embodiment.

The clock generator 216 shown in FIG. 7 receives the original clock having a frequency of approximately 21 MHz from the original oscillator 23 (shown in FIG. 3), and generates the system clock signal SYSCK and the clock signal PH12 and etc. necessary for the S-CPU 18 and the C-CPU 34. With referring to FIG. 17, the clock generator 216 receives the original clock signal Z21M, and outputs the same as a clock signal 21M as shown in FIG. 18 or FIG. 19 through a buffer 218. The clock signal 21M is applied to clock inputs of D-FFs 220 and 222, and applied to a clock input of D-FF 224 with being inverted by an inverter 226. In addition, a system reset signal RES is applied to each of reset inputs of the D-FFs 220–224. To a data input of the D-FF 220, an original system clock signal ZSYSCK from the clock generator 25 (FIG. 3) is applied via a buffer 228, and an output Q of the D-FF 220 is applied to a data input of the D-FF 222. An output Q of the D-FF 222 is applied to an AND gate 230 together with an inversion of the output Q of the D-FF 220. An output of the AND gate 230 is applied to one input of an AND gate 232 with being inverted, and to other input of the AND gate 232, an output Q of the D-FF 224 is applied with being inverted. Then, the output Q of the D-FF 224 is outputted as the clock signal PIH2 as shown in FIG. 18 or FIG. 19 through a buffer 234. That is, the clock signal PIH2 is a signal obtained by frequency-dividing the original clock signal 21M by ½.

The original system clock signal ZSYSCK is applied as the system clock signal SYSCK as shown in FIG. 18 or FIG. 19 via a buffer 228.

An output of the AND gate 230 is applied to a data input of a D-FF 236. As similar to D-FFs, 238, 240 and 242, to a reset input of the D-FF 236, the system reset signal RES is applied. Then, the clock signal PIH2 is applied to each of clock inputs of the D-FFs 236–242. The system clock signal SYSCK from the buffer 228 is applied to one inputs of AND gates 244 and 246 with being inverted, and to other inputs of the AND gate 244 and 246, an output Q of the D-FF 240 is applied. An output of the AND gate 244 is applied to date input of the D-FF 238, and an output Q of the D-FF 238 is applied to an OR gate 248 together with inversions of a signal SCPURDB which becomes a low level at time that the S-CPU 18 reads-out the program data from the M-ROM 22 and a signal SCPUWRD which becomes a low level or a high level at a time that the S-CPU 18 reads-out the data from the B-RAM 32 or the I-RAM 36 or writes the data in the B-RAM 32 or the I-RAM 36. An output of the D-FF 236 is applied to a data input of the D-FF 240 via an OR gate 250 together with an output of an AND gate 246. An output Q of the D-FF 240 is applied to an AND gate 252 together with an output of the OR gate 248, and an output of an AND gate 252 is applied to an OR gate 254 together with an output of the OR gate 250. An output of the OR gate 254 is applied to a data input of the D-FF 242.

The output Q of the D-FF 240 is outputted as the signal SSSYNC for allowing the access by the S-CPU 18 to the memory 22, 32 or 36 at a time that the S-CPU 18 operates at 3.58 MHz. The output Q of the D-FF 242 is outputted as the timing signal SSYNC for allowing the access by the S-CPU 18 to the memory 22, 32 or 36. That is, as shown in FIG. 18 or FIG. 19, the signal SSYNC has a trailing edge which is slightly advanced to a trailing edge of the system clock signal SYSCK (shown in FIG. 18 or FIG. 19 by SYSCK-FAST or SYSCK-SLOWS), and the signal SSYNC has a leading edge which is in synchronization with a leading edge of the signal SSSYNC, and the signal SSSYNC reads a trailing edge after a time equal to two periods of the original clock signal 21M.

Thus, the operation clock signal SYSCK of the S-CPU 18 and the operation clock signal PIH2 of the C-CPU 34 are generated by the clock generator 216, and the signal SSYNC (SSSYNC) for allowing or inhibiting the accesses by the S-CPU 18 and the C-CPU 34 to the memory 22, 32 or 36 is generated.

In order to make the system clock signal SYSCK and the clock signal PHI2 to be in phase with each other, the original clock signal 21M is utilized; however, the time that the clock signal SYSCK becomes in phase with the signal 21M is the time of SYSCK-FAST or SYSCK-SLOW shown in FIG. 18 or FIG. 19. Then, the S-CPU 18 reads the data read-out from the memory 22, 32 or 36 at the trailing edge of the clock signal SYSCK-FATS or SYSCK-SLOW. Therefore, a period that the S-CPU 18 accesses the memory is to be positioned prior to the trailing edge of the clock signal SYSCK. Therefore, in the clock generator 216 shown in FIG. 17, the trailing edge of the signal SSYNC or SSSYNC exists prior to the trailing edge of the clock signal SYSCK. In addition, when the S-CPU 18 operates at 3.58 MHz, a phase of the clock signal SYSCK is changed as shown in FIG. 19, and therefore, if the signal SSSYNC is utilized for allowing the access by the S-CPU 18, there is a possibility that the access by the S-CPU 18 overlaps with preceding or succeeding operation cycle. Therefore, as shown in FIG. 19, at this time, the signal SSSYNC having a high level period shorter than a high level period of the signal SSSYNC is utilized.

Then, as described above, during a high level period of the signal SSYNC (SSSYNC), the access by S-CPU 18 to the memory is allowed, and during a low level period, the access by the C-CPU 34 to the memory is allowed so that the S-CPU 18 and the C-CPU 34 can access in a dual phase the memory 22, 32 or 36 at the substantially same time.

Now, with referring to FIG. 20 to FIG. 25, interactions performed between the S-CPU 18 and the C-CPU 34 via the SCPUIF 134 will be described.

Figure 20:
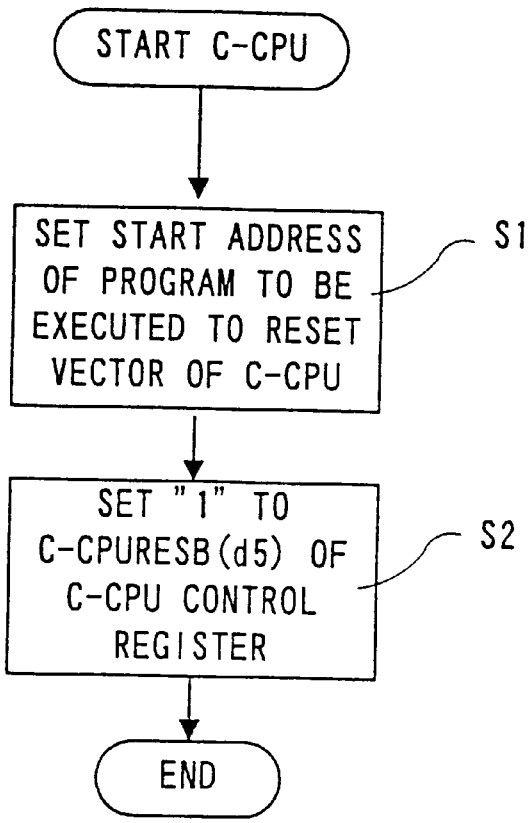
FIG. 20 is a flowchart showing an operation in which the S-CPU starts the C-CPU in the embodiment.

In a case where the S-CPU 18 starts the C-CPU 34, as shown in a step S1 of FIG. 20, the S-CPU 18 sets a starting address of a program which is to be executed by the C-CPU into the reset vector registers 148 and 150 with utilizing the data SD0–SD7. Then, in a step S2, "1" is set in the C-CPU control register 138 by the data bit SD5. In response thereto, the C-CPU reset signal CRES of a high level is outputted from the C-CPU control register 138, and the reset signal CRES is applied to the C-CPU 34 as shown in FIG. 7, whereby the reset state of the C-CPU 34 is released. Then, the C-CPU accesses the M-ROM 22 to execute the program stored in the M-ROM 22 from the starting address designated by the reset vector registers 148 and 150.

Figure 21:
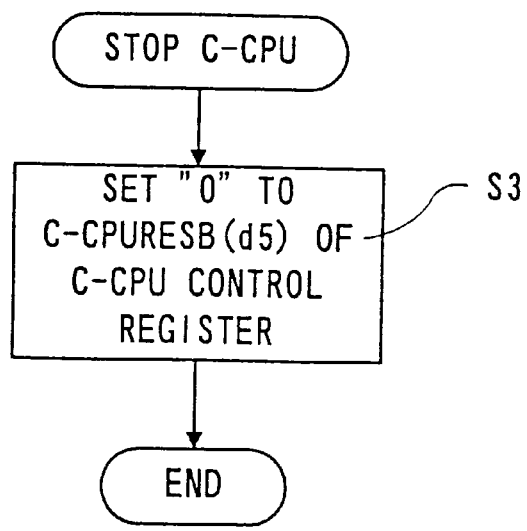
FIG. 21 is a flowchart showing an operation in which the S-CPU stops the C-CPU in the embodiment.
Figure 22:
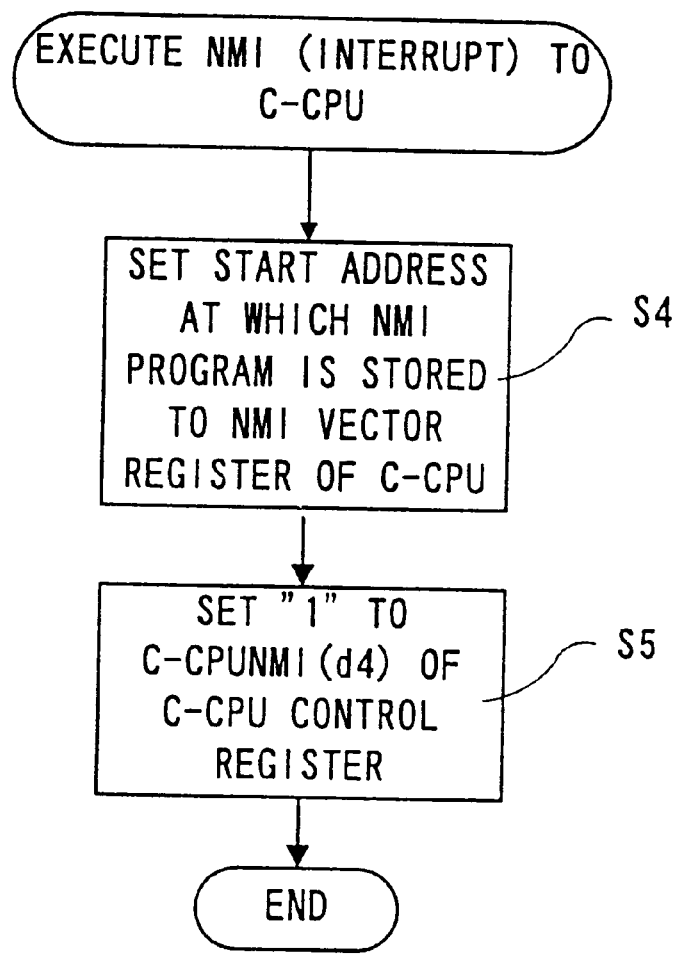
FIG. 22 is a flowchart showing an operation in which the S-CPU makes an NMI interrupt to the C-CPU in the embodiment.

In a case where the S-CPU 18 stops the C-CPU 34, as shown in a step S3 of FIG. 21, the S-CPU 18 sets "0" in the C-CPU control register 138 with utilizing the data bit SD5. In response thereto, the C-CPU reset signal CRES of a low level is outputted from the C-CPU control register 138, and the reset signal RES is applied to the C-CPU 34 as shown in FIG. 7, whereby the C-CPU 34 is reset.

In a case where the S-CPU 18 makes the NMI interrupt to the C-CPU 34, as shown in a step S4 in FIG. 21, the S-CPU 18 sets a starting address of the M-ROM 22 at which the NMI program is stored into the NMI vector registers 152 and 154 with utilizing the data SD0–SD7. Then, in a step S6, "1" is set in the C-CPU control register 140 with utilizing the data bit SD4. In response thereto, the C-CPU interrupt signal CNMI of a high level is outputted from the C-CPU control register 140, and the signal CNMI is applied to the C-CPU 34 as shown in FIG. 7, whereby the interrupt to the C-CPU 34 is started. Then, the C-CPU 34 accesses the M-ROM 22 so as to the NMI interrupt program stored in the M-ROM 22 from the starting address designated by the NMI vector registers 152 and 154.

Figure 23:
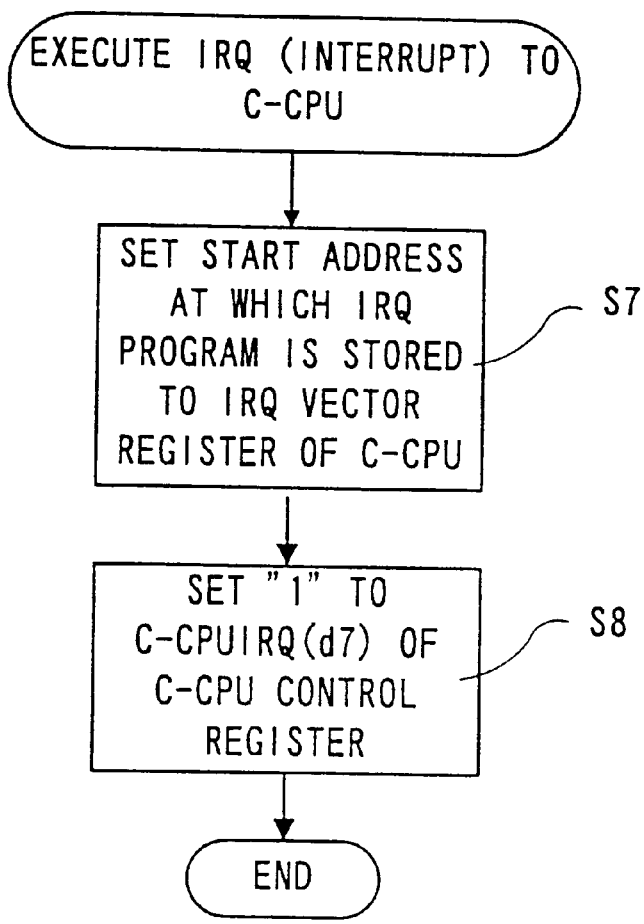
FIG. 23 is a flowchart showing an operation in which the S-CPU makes an IRQ interrupt to the C-CPU in the embodiment.

In a case where the S-CPU 18 makes the IRQ interrupt to the C-CPU 34, as shown in a step S7 in FIG. 23, the S-CPU 18 sets a starting address of the M-ROM 22 at which the IRQ program is stored into the IRQ vector registers 156 and 158 with utilizing the data SD0–SD7. Then, in a step S8, "1" is set in the C-CPU control register 136 with utilizing the data bit SD7. In response thereto, the C-CPU interrupt signal CIRQ of a high level is outputted from the C-CPU control register 136, and the signal CIRQ is applied to the C-CPU 34 as shown in FIG. 7, whereby the interrupt to the C-CPU 34 is started. Then, the C-CPU 34 accesses the M-ROM 22 so as to the IRQ interrupt program stored in the M-ROM 22 from the starting address designated by the IRQ vector registers 156 and 158.

Figure 24:
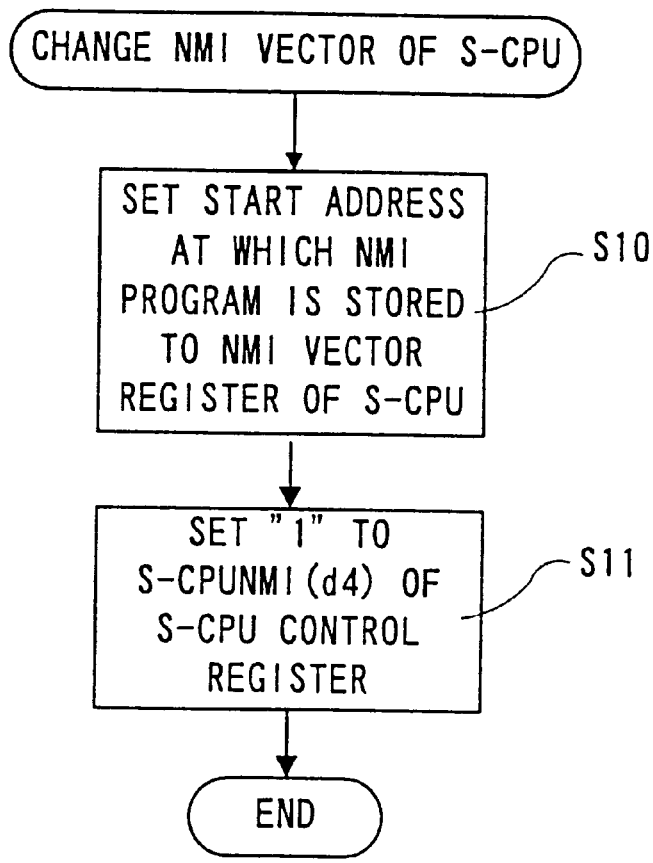
FIG. 24 is a flowchart showing an operation in which an NMI vector of the S-CPU is changed by the C-CPU in the embodiment.

Next, in a case where the C-CPU 34 changes the NMI vector of the S-CPU 18, as shown in a step S10 in FIG. 24, the C-CPU 34 sets a starting address of the M-ROM 22 at which the NMI program is stored into the NMI vector registers 170 and 172 with utilizing the data CD0–CD7. Then, in a step S11, "1" is set in the S-CPU control register 162 with utilizing the data bit CD4. In response thereto, the NMI vector address which is read at a time that the S-CPU 18 is interrupted is changed from the M-ROM 22 to the NMI vector registers 170 and 172. In addition, the S-CPU 18 accesses the M-ROM 22 upon the NMI interrupt, and execute the NMI interrupt program from the staring address designated by the NMI vector registers 170 and 171.

Figure 25:
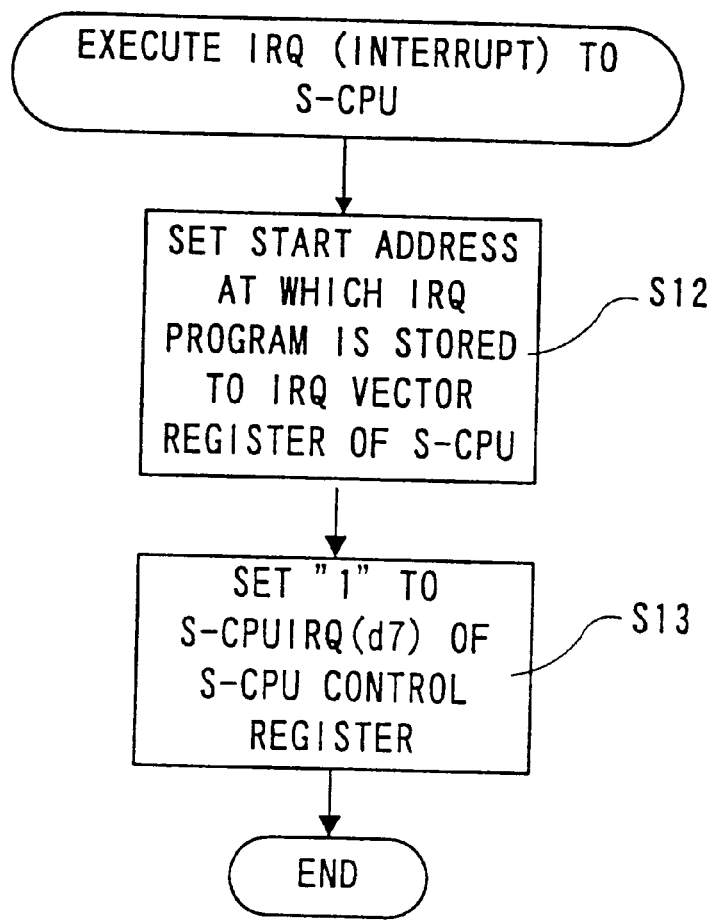
FIG. 25 is a flowchart showing an operation in which the C-CPU makes an IRQ interrupt to the S-CPU in the embodiment.

Then, in a case where the C-CPU 34 makes the IRQ interrupt to the S-CPU 18, as shown in a step S12 in FIG. 25, the C-CPU 34 sets a starting address of the M-ROM 22 at which the IRQ program is stored into the IRQ vector registers 174 and 176 with utilizing the data CD0–CD7. Then, in a step S13, "1" is set in the S-CPU control register 162 with utilizing the data bit CD7. In response thereto, the S-CPU interrupt signal SIRQ of a high level is outputted from the S-CPU control register 162, and the signal SIRQ is applied to the S-CPU 18, whereby the interrupt to the S-CPU 18 is started, Then, the S-CPU 18 accesses the M-ROM 22 so as to the IRQ interrupt program stored in the M-ROM 22 from the starting address designated by the IRQ vector registers 174 and 176.

In the game system 10 of the embodiment shown, the C-CPU 34 of the co-processor 30 wields its power on (a) an accelerator mode, (b) a mixed processing mode, and (c) a substitution processing mode mainly.

(a) Accelerator Mode

Figure 26:
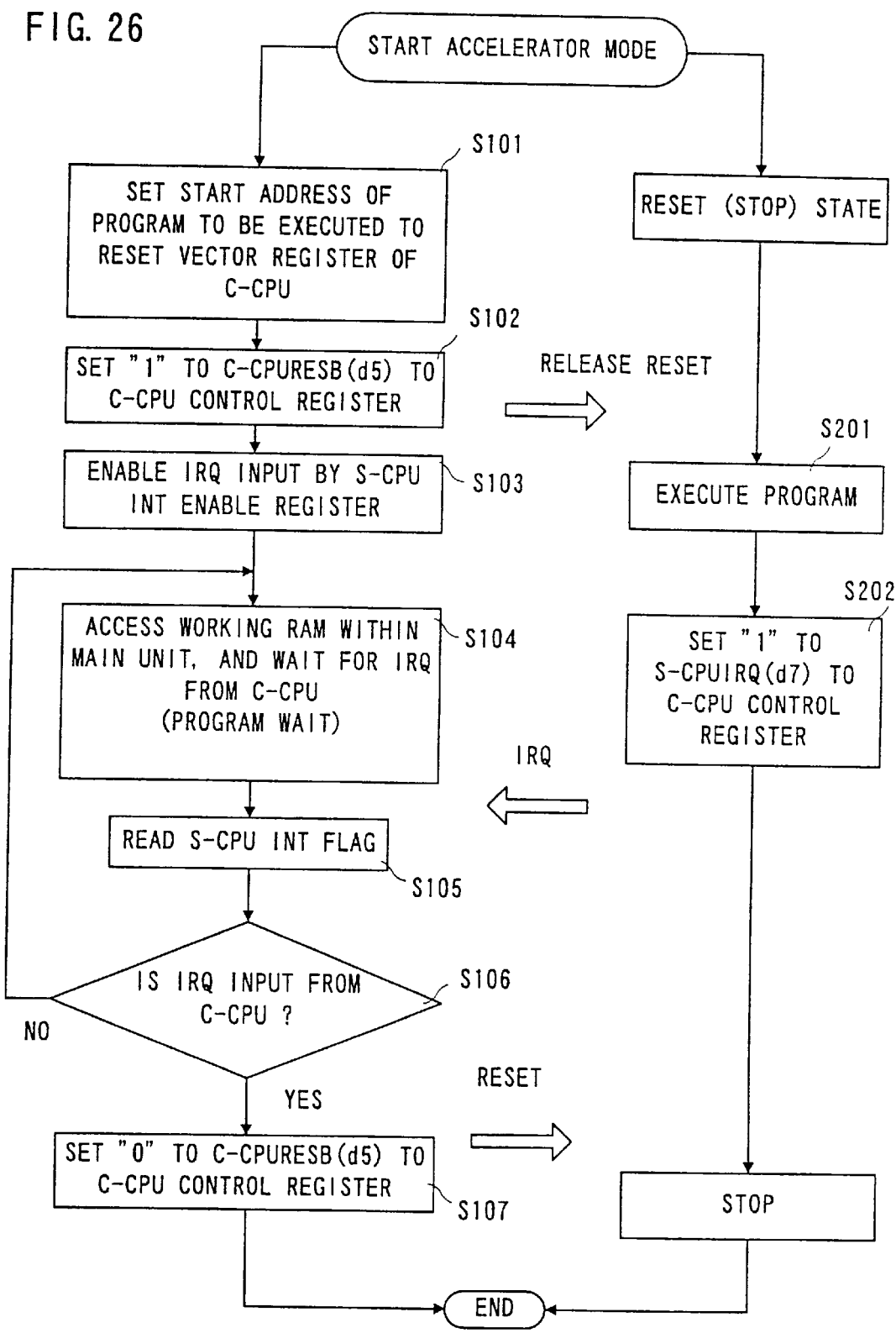
FIG. 26 is a flowchart showing an operation of an accelerator mode in the embodiment.

In this mode, as shown in FIG. 26, the C-CPU 34 is brought into its stopped state. Then, in a step S101, the S-CPU 18 sets a starting address of a program that the S-CPU 18 intends to make the C-CPU 34 execute into the reset vector registers 148 and 150 with utilizing the data SD0–SD7. Then, in a step S102, the S-CPU 18 sets "1" in the C-CPU control register 138 by the data bit SD5. In response thereto, the C-CPU reset signal CRES of a high level is outputted from the C-CPU control register 138, and the reset signal is applied to the C-CPU 34, whereby the reset state of the C-CPU 34 is released. Accordingly, the C-CPU 34 accesses the M-ROM 22 in a step S201 of FIG. 26 to execute the program stored in the M-ROM 22 from the starting address as designated.

In order to send a result of the execution of the program to the S-CPU 18, the C-CPU 34 sets "1" in the C-CPU control register 162 with utilizing the data bit CD7 in a step S202. In response thereto, the S-CPU interrupt signal SIRQ of a high level is outputted from the S-CPU control register 162 and the AND gate 184, and the signal SIRQ is applied to the S-CPU 18, and therefore, the interrupt to S-CPU 18 is made.

The S-CPU 18 executes steps S103, S104 and S105 until the above described IRQ is detected in the step S106. More specifically, in order to make the IRQ interrupt from the C-CPU 34 to be enabled, the S-CPU 18 first enables the INT enable register 144 in a step S103. In response thereto, the signal CIRQEN is outputted from the register 144, and applied to the AND gate 184 shown in FIG. 16. Therefore, after that time, it is possible to make the IRQ interrupt from the C-CPU 34 to the S-CPU 18 through the AND gate 184 as described above. Then the S-CPU 18 is transferred to the W-RAM 24 within the main unit 12 in a step S104 to wait for the IRQ interrupt from the C-CPU 34 (program wait).

After the C-CPU 18 detects the IRQ from the C-CPU 34 and receives the processing result from the C-CPU 34, the S-CPU 18 sets "1" in the C-CPU control register 138 with utilizing the data bit SD5 in a step S107. In response thereto, the C-CPU reset signal CRES of a low level is outputted from the C-CPU control register 138, and applied to the C-CPU 34, and therefore, the C-CPU 34 is reset and brought into its stopped state.

Figure 27:
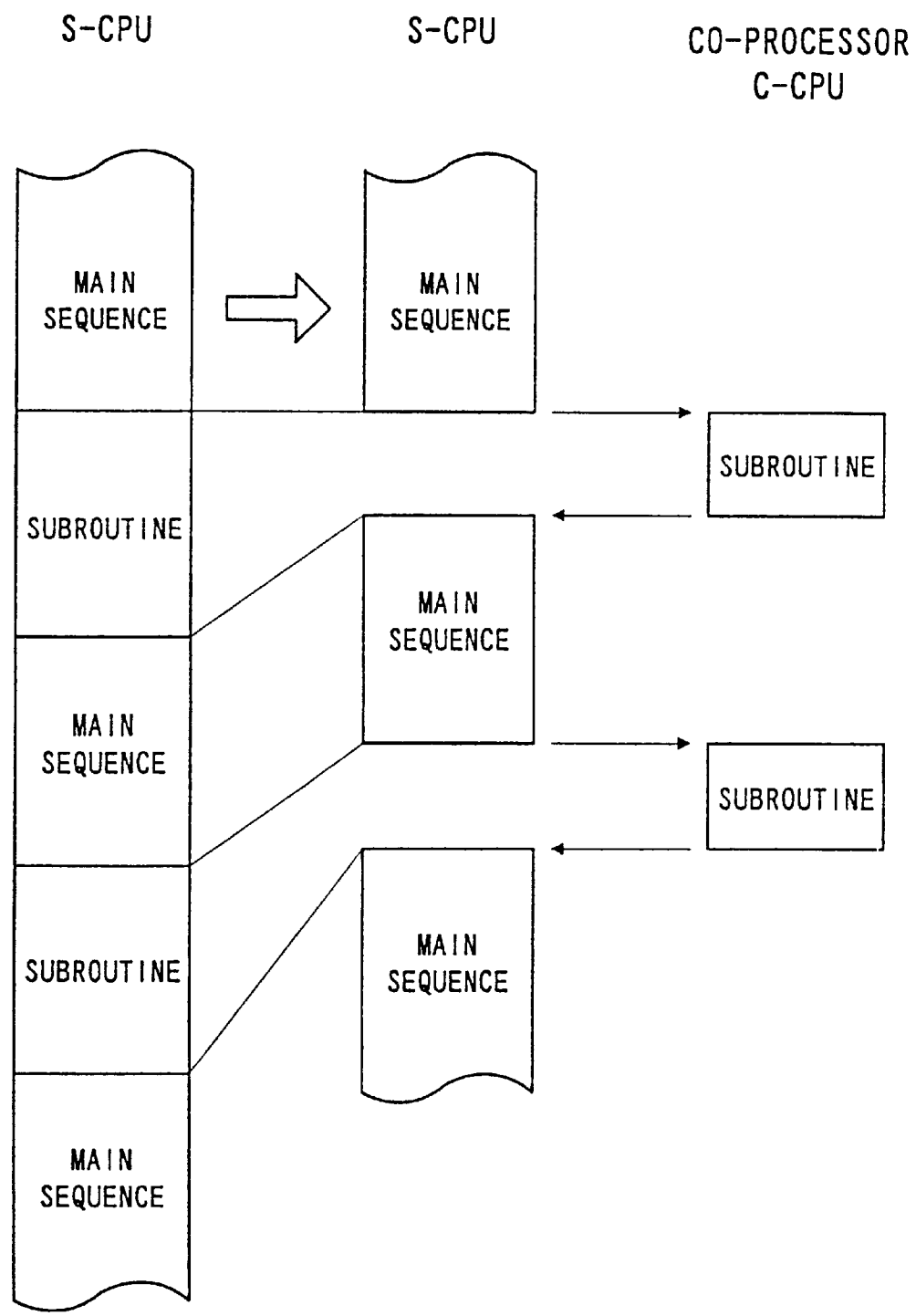
FIG. 27 is an illustrative view showing distributed processings of the system operated according to FIG. 26.

In such the accelerator mode, as shown in FIG. 27, by making the C-CPU 34 execute sub-routines which takes a long time such as a determination of collision, arithmetic operations of 3-dimension coordinates and etc., the S-CPU 18 can execute the processing extremely rapidly in whole.

(b) Mixed Processing Mode

Figure 28:
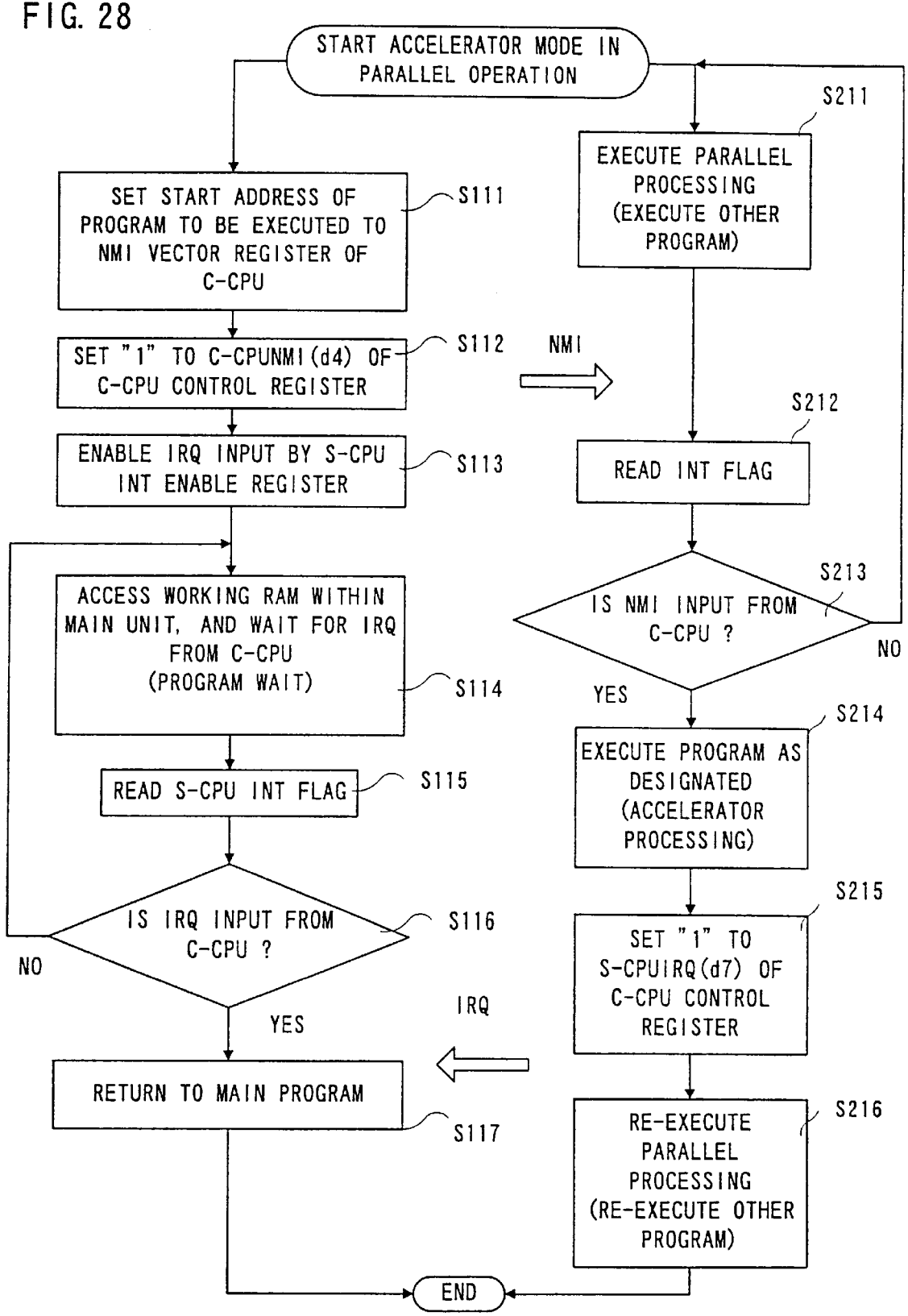
FIG. 28 is a flowchart showing an operation of a mixed processing mode in the embodiment.

In this case, the C-CPU 34 executes a parallel processing (execution of other program) as in a step S211 in FIG. 28. Then, as shown in a step S111 in FIG. 28, the S-CPU 18 sets a starting address of the M-ROM 22 at which the NMI program is stored into the NMI vector registers 152 and 154 with utilizing the date SD0–SD7. Then, in a step S112, the S-CPU 18 sets "1" in the C-CPU control register 140 with utilizing the data bit SD4. In response thereto, the C-CPU interrupt signal CNMI of a high level is outputted from the C-CPU control register 140, and applied to the C-CPU 34, whereby the NMI interrupt to the C-CPU 34 is started. In addition, the C-CPU 34 reads an interrupt flag in a step S212 to detect, in a step S213, whether or not the NMI interrupt from the S-CPU 18 is inputted. The C-CPU 34 executes the above described accelerator mode in a step S214 upon the detection of the NMI interrupt from the S-CPU 18.

In order to send a result of the execution of the program to the S-CPU 18, the C-CPU 34 sets "1" in the S-CPU control register 162 with the data bit CD7 in a step S215. In response thereto, the S-CPU interrupt signal SIRQ of a high level is outputted from the S-CPU control register 162 and the AND gate 184, and applied to the S-CPU 18, and therefore, the S-CPU 18 receives the interrupt. That is, the S-CPU 18 executes the IRQ interrupt program stored in the M-ROM 22 from the starting address as designated.

The S-CPU 18 executes steps S113, S114, and S115 until the above described IRQ is detected in the step S116. More specifically, in order to make the IRQ interrupt from the C-CPU 34 to be enabled, the S-CPU 18 first enables the INT enable register 144 in a step S113. In response thereto, the signal CIRQEN is outputted from the register 144, and applied to the AND gate 184 shown in FIG. 16. Therefore, after that time, it is possible to make the IRQ interrupt from the C-CPU 34 to the S-CPU 18 through the AND gate 184 as described above. Then, the S-CPU 18 is transferred to the W-RAM 24 within the main unit 12 in a step S114 to wait for the IRQ interrupt from the C-CPU 34 (program wait).

In a step S115, the S-CPU 18 reads the interrupt flag to detect, in a step S116, the IRQ from the C-CPU 34. The S-CPU 18 returns to the main routine in a step S117. The C-CPU 34 re-starts the parallel processing (the execution of other program) which has been stopped by the interrupt from the S-CPU 18.

Such the mixed processing mode is especially effective against a case where in parallel processing, the co-processor (the C-CPU 34) has a sufficient capacity, and therefore, the processing speeds of the S-CPU 18 and the C-CPU 34 are intended to be balanced, and against sub-routines (various kinds of arithmetic operation sub-routines, calculations of parameters for rotation, enlargement or reduction and etc.) having a relative high frequency in use at an end of the S-CPU 18. That is, even in a case where the two CPUs execute the parallel processing, the C-CPU 34 can be started as an accelerator for the S-CPU 18, and therefore, it is possible to make the processing speeds of the both CPUs to be balanced.

Figure 29:
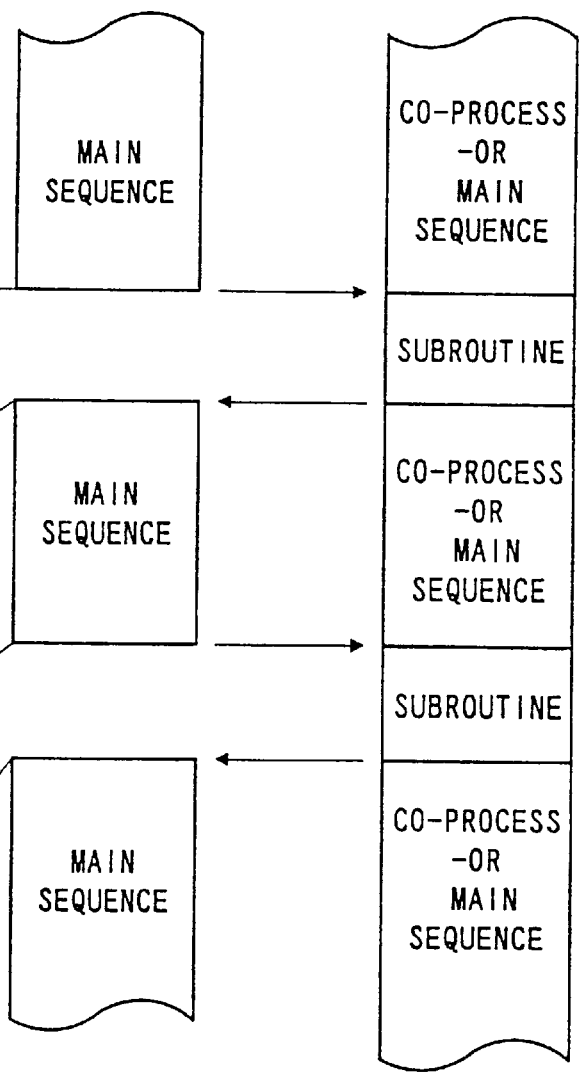
FIG. 29 is an illustrative view showing a state of the distributed processings of the system operated according to FIG. 28.

FIG. 29 is an illutrative view showing a state of the distributed processings of the system operated according to FIG. 28.

(c) Substitution Processing Mode

Figure 30:
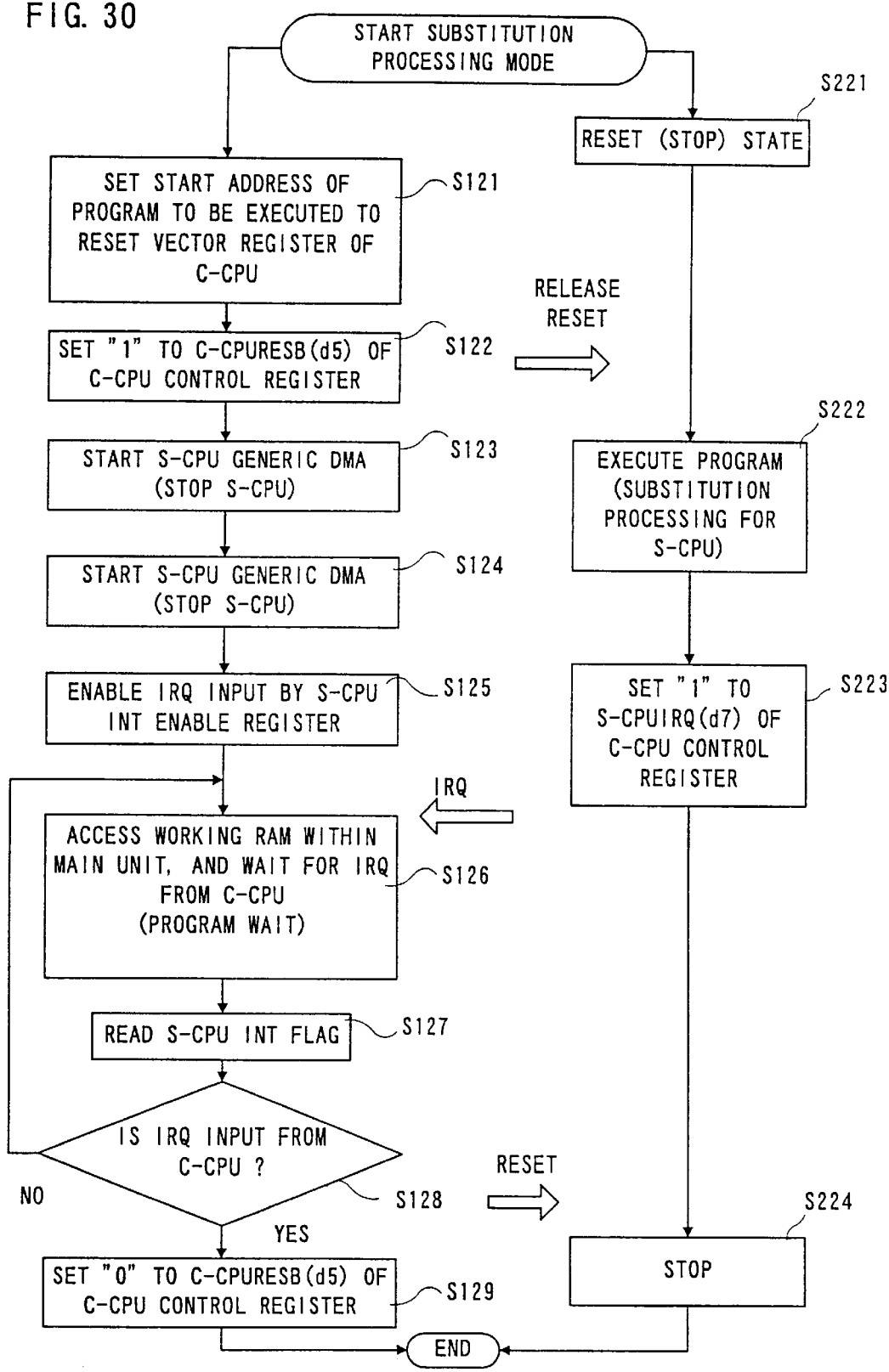
FIG. 30 is a flowchart showing an operation of a substitution processing mode in the embodiment.

In this mode, as shown in FIG. 30, the C-CPU 34 is brought into its stopped state in a step S221. Then, in a step S121, the S-CPU 18 sets a starting address of a program that the S-CPU 18 intends to make the C-CPU 34 execute into the reset vector registers 148 and 150 with utilizing the data SD0–SD7. Then, in a step S122, the S-CPU 18 sets "1" in the C-CPU control register 138 by the data bit SD5. In response thereto, the C-CPU reset signal CRES of a high level is outputted from the C-CPU control register 138, and the reset signal is applied to the C-CPU 34, whereby the reset state of the C-CPU 34 is released. Accordingly, the C-CPU 34 accesses the M-ROM 22 in a step S222 of FIG. 30 to execute the program stored in the M-ROM 22 from the starting address as designated.

Thereafter, the S-CPU 18 performs a DMA by executing a step S123 and a step S124. At this time, the C-CPU 34 executes the program in substitution with the S-CPU 18 (substitution processing).

In order to send a result of the execution of the program to the S-CPU 18, the C-CPU 34 sets "1" in the C-CPU control register 162 with utilizing the data bit CD7 in a step S223. In response thereto, the S-CPU interrupt signal SIRQ of a high level is outputted from the S-CPU control register 162 and the AND gate 184, and the signal SIRQ is applied to the S-CPU 18, and therefore, the interrupt to S-CPU 18 is made.

The S-CPU 18 executes steps S125, S126 and S127 until the above described IRQ is detected in the step S128. More specifically, in order to make the IRQ interrupt from the C-CPU 34 to be enabled, the S-CPU 18 first enables the INT enable register 144 in a step S125. In response thereto, the signal CIRQEN is outputted from the register 144, and applied to the AND gate 184 shown in FIG. 16. Therefore, after that time, it is possible to make the IRQ interrupt from the C-CPU 34 to the S-CPU 18 through the AND gate 184 as described above. Then the S-CPU 18 is transferred to the W-RAM 24 within the main unit 12 in a step S126 to wait for the IRQ interrupt from the C-CPU 34 (program wait).

After the interrupt flag is read in a step S127 and the IRQ from the C-CPU 34 is detected in a step S128 and the processing result from the C-CPU 34 is received, the S-CPU 18, in a step S129, sets "0" in the C-CPU control register 138 with data bit SD5. In response thereto, the C-CPU reset signal CRES of a low level is outputted from the C-CPU control register 138, and applied to the C-CPU 34, whereby the C-CPU 34 is reset and brought into its stopped state (step S224).

Figure 31:
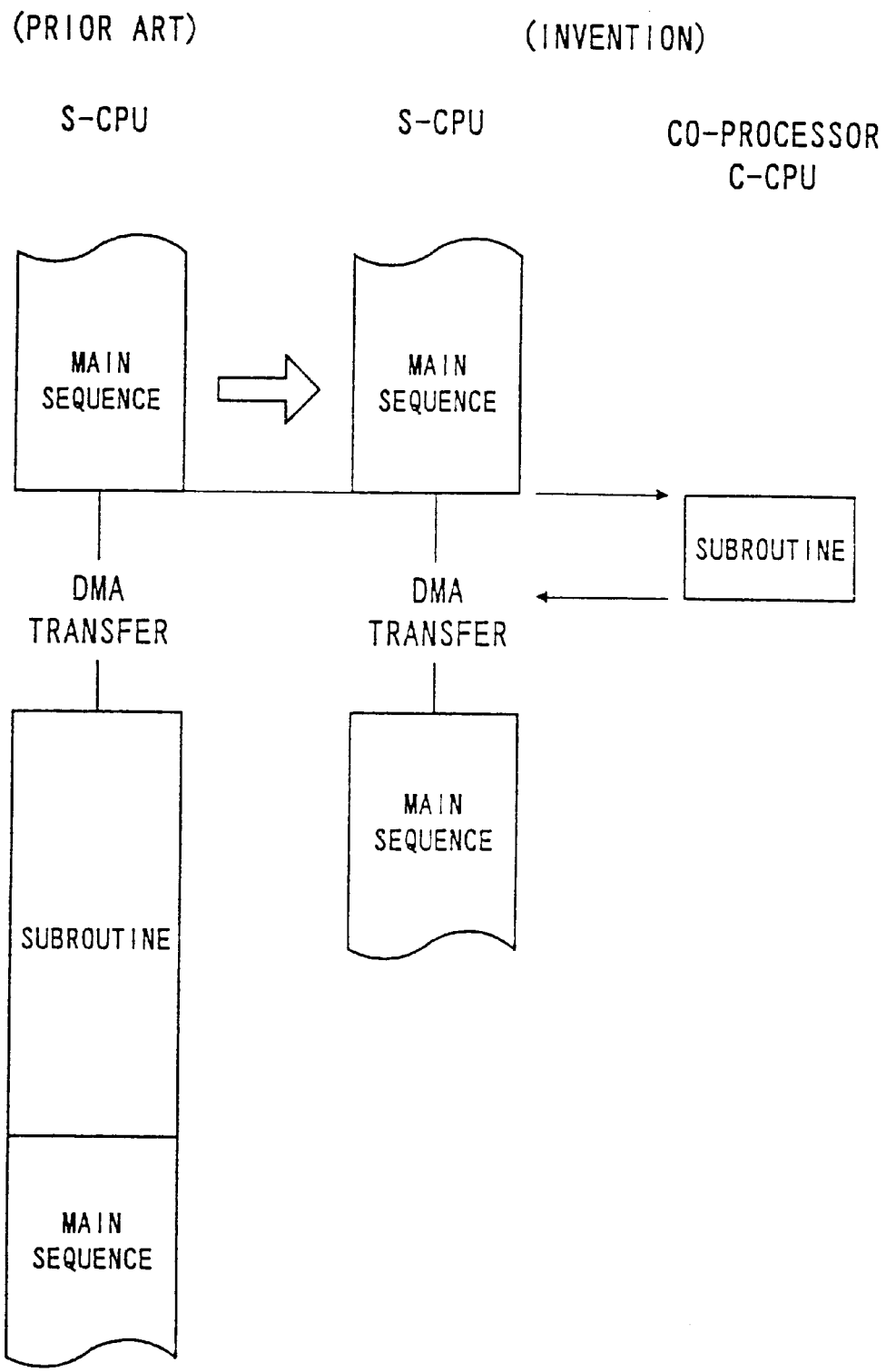
FIG. 31 is an illustrative view showing a state of distributed processings in the system operated according to FIG. 30.

In such the substitution processing mode, as shown in FIG. 31, since the S-CPU 18 is stopped in performing the DMA, by making the C-CPU 34 execute the processing that is executed in series in the prior art, a large increase of the processing speed in whole can be expected. Therefore, the substitution processing mode is especially effective against sub-routine in which the processing is repeated in parallel with the DMA such as developments of reduced images, animations and etc.

In addition, in the above described embodiment, the access time of the memory such as the M-ROM 22, B-RAM 32 and I-RAM 36 is shorter than not only the cycle time of the S-CPU 18 but also the cycle time of the C-CPU 34. That is, the access speed for the memory is rapid in comparison with the operation speeds of the S-CPU 18 and the C-CPU 34; however, it is unnecessary for all the memories to satisfy such a condition, and the condition may be satisfied in a memory which can be accessed by two CPUs or processors.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A co-processor system, comprising:

a first processor for performing operations based on a program, said first processor having a first cycle time;

a second processor for performing operations based on said program, said second processor having a second cycle time, said second cycle time being shorter than said first cycle time;

a program memory storing said program, said program memory being directly accessed by said first processor and said second processor, said program memory being accessed with an access time, said access time being equal to or shorter than a half of said first cycle time and equal to or shorter than said second cycle time;

a first clock signal generator providing a first clock signal functioning as a reference of said first cycle time;

a second clock generator providing a second clock signal, said second clock signal being higher in frequency than said first clock signal and functioning as a reference of said second cycle time to said second processor;

an access switch signal output circuit for outputting a first level signal in a first time period of said first cycle time, said first time period being equal to or longer than said access time of said program memory, said access switch signal output circuit outputting a second level signal in a second time period of said first cycle time, said second time period being a time period other than said first time period and including more than one said second cycle time; and an access controller for controlling whether said first and second processors are to directly access said program memory, wherein: when said access switch signal output circuit outputs said first level signal and there is a request for said first processor to access said program memory, said access controller enables said first processor to directly access said program memory in response to said request for said first processor to access said program memory; when said access switch signal output circuit outputs said first level signal and there is no request for said first processor to access said program memory, said access controller enables said second processor to directly access said program memory in response to a request for said second processor to access said program memory; and when said access switch signal output circuit outputs said second level signal, said access controller enables said second processor to directly access said program memory in response to the request for said second processor to access the program memory, and wherein the second processor accesses the program memory within said second period while said first processor is not put in a wait state for accessing said program memory.

2. A method for operating an information processing apparatus having a first cycle time, and which accesses a program memory, and operates according to a program, comprising the steps of:

providing a second processor having a program compatibility with said first processor, and having a second cycle time, said second cycle time being shorter than said first cycle time;

using a program memory having an access time, said access time being equal to or shorter than a half of said first cycle time and equal to or shorter than said second cycle time;

securing a first level signal in a first time period of said first cycle time, said first time period being equal to or longer than said access time of said program memory;

securing a second level signal in a second time period of said first cycle time, said second time period being a time period other than said first time period and including more than one said second cycle time; and controlling whether the first and second processors are to directly access said program memory, wherein: when a first level signal is present and there is a request for said first processor to access said program memory said first processor is enabled to directly access said program memory in response to said request for said first processor to access said program memory; when a first level signal is present and there is no request for said first processor to access said program memory, said second processor is enabled to directly access said program memory in response to a request for said second processor to access said program memory; and when said second level signal is present, said second processor is enabled to directly access said program memory in response to the request for said second processor to access the program memory, wherein said second processor can access said program memory while said first processor is not put in a wait state for accessing said program memory.

3. A co-processor system, comprising:

a first processor for performing operations based on a program, said first processor having a first cycle time;

a second processor for performing operations based on said program, said second processor having a second cycle time, said second cycle time being shorter than said first cycle time;

a program memory storing said program, said program memory being directly accessed by said first processor and said second processor, said program memory being accessed with an access time, said access time being equal to or shorter than a half of said first cycle time and equal to or shorter than said second cycle time;

a first clock signal generating means generating a first clock signal functioning as a reference of said first cycle time;

a second clock signal generating means generating a second clock signal, said second clock signal being higher in frequency than said first clock signal and functioning as a reference of said second cycle time to said second processor;

an access switch signal output means for outputting a first level signal in a first time period of said first cycle time, said first time period being equal to or longer than said access time of said program memory said access switch signal output means outputting a second level signal in a second time period of said first cycle time, said second time period being a time period other than said first time period and including more than one said second cycle time; and an access control means for controlling whether said first and second processors are to directly access said program memory, wherein: when said access switch signal output means outputs said first level signal and there is a request for said first processor to access said program memory, said access control means enables said first processor to directly access said program memory in response to said request for said first processor to access said program memory; when said access switch signal output means outputs said first level signal and there is no request for said first processor to access said program memory, said access control means enables said second processor to directly access said program memory in response to a request for said second processor to access said program memory; and when said access switch signal output means outputs said second level signal, said access control means enables said second processor to directly access said program memory in response to the request for said second processor to access the program memory, and wherein the second processor accesses the program memory within said second period while said first processor is not put in a wait state for accessing said program memory.

4. A co-processor system according to claim 1, further comprising a first data latch which applies program data read-out from said program memory to a data bus of said first processor; and a first latch signal applying means which applies a first latch signal defined in accordance with said first clock to said first data latch.

5. A co-processor system according to claim 4, wherein a trailing edge of said first latch signal is phase advanced relative to a trailing edge of said first clock.

6. The co-processor system according to claim 1, wherein said first and second processors have the same architecture.

7. An external memory unit having an auxiliary processing function, said external memory unit being detachably attached to an information processing apparatus, said information processing apparatus including a first processor performing operations based on a program, said first processor having a first cycle time, and a first clock signal generating means which generates a first clock signal functioning as a reference for said first cycle time, said memory unit comprising:

a second processor performing operations based on said program, said second processor having a second cycle time, said second cycle time being shorter than said first cycle time;

a second clock signal generating means which generates a second clock signal, said second clock signal being higher in frequency than said first clock signal and functioning as a reference of said second cycle time to said second processor;

a program memory storing said program, said program memory being directly accessed by said first processor and said second processor during an access time of said program memory, said access time being equal to or shorter than a half of said first cycle time and equal to or shorter than said second cycle time;

an access switch signal output means for outputting a first level signal in a first time period of said first cycle time, said first time period being equal to or longer than said access time of said program memory, said access switch signal output means outputting a second level signal in a second time period of said first cycle time, said second time period being a time period other than said first time period and including more than one said second cycle time; and an access control means for controlling whether said first and second processors are to directly access said program memory, wherein: when said access switch signal output means outputs said first level signal and there is a request for said first processor to access said program memory, said access control means enables said first processor to directly access said program memory in response to said request for said first processor to access said program memory; when said access switch signal output means outputs said first level signal and there is no request for said first processor to access said program memory, said access control means enables said second processor to directly access said program memory in response to a request for said second processor to access said program memory; and when said access switch signal output means outputs said second level signal, said access control means enables said second processor to directly access said program memory in response to the request for said second processor to access the program memory, and wherein the second processor accesses the program memory within said second time period while said first processor is not put in a wait state for accessing the program memory.

8. An external memory unit according to claim 7, further comprising a first data latch which applies program data read-out from said program memory to a data bus of said first processor; and a first latch signal applying means which applies a first latch signal defined in accordance with said first clock to said first data latch.

9. An external memory unit according to claim 8, wherein a trailing edge of said first latch signal is phase advanced relative to a trailing edge of said first clock.

10. An external memory unit according to claim 7, wherein said program includes a first program and a second program, and said access control means includes a starting address register which designates a starting address at a time that said second processor execution of a program stored in said program memory, and said program memory stores said first program executed by said first processor and said second progran executed by said second processor in a mixed manner, and said external memory unit further comprising a stop process means which stops execution of said second program at a time that an access from said first processor occurs when said second program is executed from an address designated by said starting address register, wherein loading an address being stopped into said starting address register, causes said second processor to restart from said address designated by said starting address register after a completion of said access of said first processor.

11. An external memory unit according to claim 10, wherein said second processor includes an internal register which temporarily holds a processing result obtained through an execution of said second program, and said external memory unit further comprising a save memory for saving said result held by said internal register, wherein during said execution of said second program by said second processor, said result held by said internal register is saved into said save memory in executing a new second program, and after completion of said execution of said new second program, said result saved in said save memory is returned to said internal register, whereby said second program can be executed again.

12. The memory unit according to claim 7, wherein said first and second processors have the same architecture.

\* \* \* \* \*